United States Patent
Noh et al.

(10) Patent No.: US 9,871,612 B2
(45) Date of Patent: Jan. 16, 2018

(54) METHOD FOR SETTING TIMING OF RESPONSE INFORMATION TRANSMISSION CHANNEL IN TDD-FDD JOINT OPERATION AND APPARATUS THEREFOR

(71) Applicant: KT CORPORATION, Gyeonggi-do (KR)

(72) Inventors: Minseok Noh, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 44 days.

(21) Appl. No.: 15/025,001

(22) PCT Filed: Sep. 18, 2014

(86) PCT No.: PCT/KR2014/008695
§ 371 (c)(1),
(2) Date: Mar. 25, 2016

(87) PCT Pub. No.: WO2015/046807
PCT Pub. Date: Apr. 2, 2015

(65) Prior Publication Data
US 2016/0242168 A1 Aug. 18, 2016

(30) Foreign Application Priority Data

Sep. 27, 2013 (KR) .................. 10-2013-0115725
Sep. 30, 2013 (KR) .................. 10-2013-0116824
May 21, 2014 (KR) .................. 10-2014-0061209

(51) Int. Cl.
*H04J 3/16* (2006.01)
*H04L 5/00* (2006.01)
(Continued)

(52) U.S. Cl.
CPC .......... *H04J 3/1694* (2013.01); *H04L 1/1854* (2013.01); *H04L 5/00* (2013.01);
(Continued)

(58) Field of Classification Search
CPC ........ H04L 1/1854; H04L 5/00; H04J 3/1694; H04W 72/1278; H04W 16/32; H04W 28/16
See application file for complete search history.

(56) References Cited

U.S. PATENT DOCUMENTS

2012/0269180 A1  10/2012  Li et al.
2013/0088972 A1   4/2013  Kim et al.
(Continued)

FOREIGN PATENT DOCUMENTS

CN  102231917 A  11/2011
CN  102752090 A  10/2012
(Continued)

OTHER PUBLICATIONS

LG Electronics, "CA-based aspects for FDD-TDD joint operation", R1-133372, 3GPP TSG RAN WG1 Meeting #74, Barcelona, Spain, Aug. 19-23, 2013.
(Continued)

*Primary Examiner* — Jianye Wu
(74) *Attorney, Agent, or Firm* — IP Legal Services, LLC

(57) ABSTRACT

Provided are a method and an apparatus for setting timing of a response information transmission channel for uplink transmission of a terminal configured with cells operating in different duplex modes. Provided are also a method and an apparatus for setting timing for receiving a response signal in a terminal that performs communications through one or more cells operating in different duplex modes. The method may include setting both the PCell and the SCell to be self-carrier scheduled, receiving control information for (Continued)

PUSCH transmission from the PCell or the SCell, transmitting the PUSCH at the PCell or the SCell on the basis of the control information, and receiving a PHICH for the PUSCH transmitted on the basis of the PHICH timing of the PCell or SCell in accordance with the PUSCH transmission from the PCell or the SCell.

15 Claims, 31 Drawing Sheets

(51) Int. Cl.
  *H04W 72/12* (2009.01)
  *H04L 1/18* (2006.01)
  *H04W 16/32* (2009.01)
  *H04W 28/16* (2009.01)

(52) U.S. Cl.
  CPC ........ *H04W 72/1278* (2013.01); *H04W 16/32* (2013.01); *H04W 28/16* (2013.01)

(56) References Cited

U.S. PATENT DOCUMENTS

| | | | |
|---|---|---|---|
| 2013/0301503 A1* | 11/2013 | Park | H04W 72/0406 370/311 |
| 2014/0119246 A1 | 5/2014 | Yin et al. | |
| 2014/0153449 A1 | 6/2014 | Seo et al. | |
| 2014/0321338 A1 | 10/2014 | Park et al. | |
| 2014/0334359 A1 | 11/2014 | Yin et al. | |
| 2015/0334682 A1 | 11/2015 | Yin et al. | |
| 2016/0006552 A1 | 1/2016 | Seo et al. | |
| 2016/0112178 A1 | 4/2016 | Yi et al. | |
| 2016/0192391 A1 | 6/2016 | Larsson et al. | |
| 2017/0041116 A1 | 2/2017 | Yin et al. | |

FOREIGN PATENT DOCUMENTS

| | | |
|---|---|---|
| CN | 103098397 A | 5/2013 |
| CN | 104349475 A | 2/2015 |
| CN | 104756575 A | 7/2015 |
| KR | 10-2013-0075620 A | 7/2013 |
| WO | 2012/124980 A2 | 9/2012 |

OTHER PUBLICATIONS

Research in Motion, UK Limited, "Design of HARQ and Scheduling Timing Linkage to Support Inter-band CA with Different TDD Configurations", R1-120336, 3GPP TSG RAN WG1 Meeting #68, Dresden, Germany Feb. 6-10, 2012.
New Postcom, "Discussion on TDD inter-band CA with different UL-DL configuration", R1-113685, 3GPP TSG RAN WG1 Meeting #67, San Francisco, USA, Nov. 14-18, 2011.
Ericsson et al., "HARQ and scheduling timing for eIMTA", R1-133418, 3GPP TSG-RAN WG1 #74, Barcelona, Spain, Aug. 19-23, 2013.
Samsung, "Solutions for FDD-TDD Joint Operation", R1-133102, 3GPP TSG RAN WG1 #74, Barcelona, Spain, Aug. 19-23, 2013, pp. 1-2.
ETRI, "Discussion on FDD-TDD joint operation solutions", R1-133184, 3GPP TSG RAN WG1 Meeting #74, Barcelona, Spain, Aug. 19-23, 2013, pp. 1-7.
Zukang Shen et al., "Overview of 3GPP LTE-Advanced Carrier Aggregation for 4G Wireless Communications", IEEE Communication Magazine, Feb. 2012, pp. 122-130.

* cited by examiner

— BACKHAUL LINK WITHIN CLUSTER

----- BACKHAUL LINK BETWEEN SMALL CELL AND MACRO CELL

FIG.8

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG.9

| TDD UPLINK-DOWNLINK CONFIGURATION | SUBFRAME NUMBER N | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | 7 | 7 | | | | 7 | 7 | | | |
| 6 | | | | | | | | | | 5 |

FIG.10

| TDD UPLINK-DOWNLINK CONFIGURATION | SUBFRAME INDEX n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG.11

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| FDD | | D | D | D | D | D | D | D | D | D | D |
| | | U | U | U | U | U | U | U | U | U | U |

FIG.12

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 1 | 5 ms | D | S | U | U | D | D | S | U | U | D |
| FDD | | D | D | D | D | D | D | D | D | D | D |
| | | U | U | U | U | U | U | U | U | U | U |

FIG.13

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |
| FDD | | D | U | D | D | D | D | D | D | D | D |
| | | U | | U | U | U | U | U | U | U | U |

FIG.14

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |

| FDD | D | D | D | D | D | D | D | D | D | D |
|---|---|---|---|---|---|---|---|---|---|---|
| | S | U | U | U | S | S | S | S | S | S |

FIG.15

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| FDD | | D | D | D | U | D | D | D | D | D | D |
| | | D | D | U | U | D | D | D | D | D | D |

FIG.16

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |

| FDD | | | | | | | | | | |
|---|---|---|---|---|---|---|---|---|---|---|
| D | D | U | D | D | D | D | D | D | D |
| D | ░ | ░ | ░ | ░ | ░ | ░ | ░ | ░ | ░ |

FIG.17

| UPLINK-DOWNLINK CONFIGURATION | DOWNLINK-TO-UPLINK SWITCH-POINT PERIODICITY | SUBFRAME NUMBER ||||||||||
|---|---|---|---|---|---|---|---|---|---|---|---|
| | | 0 | 1 | 2 | 3 | 4 | 5 | 6 | 7 | 8 | 9 |
| 6 | 5 ms | D | S | U | U | U | D | S | U | U | D |
| FDD | | D | D | D | D | D | D | D | D | D | D |
| | | U | | U | U | U | U | U | U | U | U |

FIG.18

| TDD UPLINK-DOWNLINK CONFIGURATION | SUBFRAME NUMBER n ||||||||||
|---|---|---|---|---|---|---|---|---|---|---|
| | 0 | 1 | 2 | 3 | 4 | 5 | 6 | 7 | 8 | 9 |
| 0 | 4,5̲ | 6,5̲ | | | | 4,5̲ | 6,5̲ | | | |
| 1 | 4,5̲ | 6,5̲ | | | 4 | 4,5̲ | 6,5̲ | | | 4 |
| 2 | 4̲ | 4,5̲ | | 4 | 4̲ | 4̲ | 5,4̲ | 4̲ | 4 | 4̲ |
| 3 | 4,6̲ | 7,6̲ | | | | 4̲ | 4̲ | 4̲ | 4 | 4,6̲ |
| 4 | 5,4̲ | 6,5̲ | | 4̲ | 4̲ | 4̲ | 4̲ | 4̲ | 4 | 4 |
| 5 | 4̲ | 5,4̲ | | 4̲ | 4̲ | 4̲ | 4̲ | 4̲ | 4 | 4̲ |
| 6 | 7,5̲ | 7,5̲ | | | | 7,4̲ | 7,5,4̲ | | | 5 |

*FIG.19*

| TDD UL/DL CONFIGURATION | SUBFRAME NUMBER n | | | | | | | | | |
|---|---|---|---|---|---|---|---|---|---|---|
| | 0 | 1 | 2 | 3 | 4 | 5 | 6 | 7 | 8 | 9 |
| 0 | 4, 5, 6 | 6 | | | 4, 5, 6 | 6 | | | | |

FIG.20

| TDD UL/DL CONFIGURATION | SUBFRAME NUMBER n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6, 5, 4 | | | 4 | 6, 5, 4 | | | | |

FIG.21

| TDD UPLINK-DOWNLINK CONFIGURATION | SUBFRAME INDEX n | | | | | | | | | |
|---|---|---|---|---|---|---|---|---|---|---|
| | 0 | 1 | 2 | 3 | 4 | 5 | 6 | 7 | 8 | 9 |
| 0 | __5__ | __5__ | 4 | 7 | 6 | __5__ | __5__ | 4 | 8 | 9 |
| 1 | __4__ | __4__ | 4 | 6 | __5__ | __4__ | __4__ | 4 | 7 | 6 |
| 2 | __4__ | __4__ | 6 | __5__ | __4__ | __4__ | __4__ | 4 | 6 | __5__ |
| 3 | __5__ | __5__ | 6 | 6 | 6 | __4__ | __4__ | 6 | __5__ | 4 |
| 4 | __4__ | __4__ | 6 | 6 | __4__ | __4__ | __4__ | __4__ | 7 | 7 |
| 5 | __4__ | __4__ | 6 | 6 | __4__ | __4__ | __4__ | __4__ | 6 | 6 |
| 6 | __5__ | __5__ | 4 | 6 | 6 | __4__ | __4__ | 4 | 7 | __5__ |

FIG.22

| TDD UL/DL CONFIGURATION | SUBFRAME INDEX n | | | | | | | | | |
|---|---|---|---|---|---|---|---|---|---|---|
| | 0 | 1 | 2 | 3 | 4 | 5 | 6 | 7 | 8 | 9 |
| 0 | 5̲ | 4̲ | 4 | 7 | 6 | 5̲ | 4̲ | 4 | 7 | 6 |

FIG.23

| TDD UL/DL CONFIGURATION | SUBFRAME INDEX n | | | | | | | | | |
|---|---|---|---|---|---|---|---|---|---|---|
| | 0 | 1 | 2 | 3 | 4 | 5 | 6 | 7 | 8 | 9 |
| 0 | 6 | 5 | 4 | 7 | 6 | 6 | 5 | 4 | 7 | 6 |

METHOD FOR SETTING TIMING OF RESPONSE INFORMATION TRANSMISSION CHANNEL IN TDD-FDD JOINT OPERATION AND APPARATUS THEREFOR

CROSS REFERENCE TO RELATED APPLICATIONS

This application is a National Stage Patent Application of PCT International Patent Application No. PCT/KR2014/008695 (filed on Sep. 18, 2014) under 35 U.S.C. §371, which claims priority to Korean Patent Application Nos. 10-2013-0115725 (filed on Sep. 27, 2013), 10-2013-0116824 (filed on Sep. 30, 2013), and 10-2014-0061209 (filed on May 21, 2014), the teachings of which are incorporated herein in their entireties by reference.

TECHNICAL FIELD

The present disclosure relates to a method and an apparatus of setting up timing for a channel of transmitting response information in response to uplink (UL) transmission of a terminal configured with cells operating in different duplex modes. More particularly, the present disclosure relates to a method and an apparatus of establishing timing of receiving a response signal in a terminal performing communications using one or more cells operating in different duplex modes.

BACKGROUND ART

Due to the development of communications systems, various types of wireless terminals have been introduced to consumers such as companies and individuals. Current mobile communications systems belonging to the 3GPP family, such as long-term evolution (LTE) and LTE-Advanced, are high-speed, high capacity communications systems that have grown out of voice-centric services. These systems may transmit and receive various types of data, such as video data or wireless data. Thus, it is necessary to develop technologies allowing high capacity data to be transmitted at rates similar to those of wired communications networks. As deployments such as a plurality of cells or a plurality of small cells are introduced, a technology and a method able to apply carrier aggregation (CA) in a variety of deployment scenarios are required. In the meantime, a terminal may communicate with a base station using a variety of cells. In this case, the plurality of cells configured for the terminal may be divided into a primary cell (PCell) and one or more secondary cells (SCells) depending on the functions thereof. For example, the PCell provides a security input, is not changed without a handover process, and may transmit a control channel for an uplink (UL). One or more SCells may be configured as a set of serving cells together with the PCell, depending on user equipment (UE) capability.

In a joint operation in which the duplex modes of the PCell and the SCell are different, the overall efficiency of the entire network is influenced by how to set up timing of UL hybrid automatic repeat request-acknowledgement (HARQ-ACK).

DISCLOSURE

Technical Problem

It is necessary to establish i) timing for transmitting a physical hybrid ARQ indicator channel (PHICH) including a hybrid automatic repeat request-acknowledgement (HARQ-ACK) in a base station and ii) timing for receiving the PHICH in a terminal for uplink (UL) data transmission when carriers operating in different duplex modes for transmitting large amounts of data are aggregated.

It is also required to establish PHICH timing when a PCell performs the UL allocation of a carrier-aggregated SCell and a terminal receives a PHICH regarding the UL data of the SCell.

Technical Solution

According to the above-described problem, the present disclosure provides a method of processing a PHICH in a terminal configured with a PCell and an SCell operating in different duplex modes. The method includes: establishing each of the PCell and the SCell to be self-carrier scheduled; receiving control information for PUSCH transmission from each of the PCell and the SCell; transmitting, in each of the PCell and the SCell, a PUSCH based on the control information; and receiving a PHICH regarding the PUSCH from the PCell or the SCell, transmitted based on PHICH timing of the PCell and the SCell in response to the transmission of the established PUSCH.

The present disclosure also provides a method of processing a PHICH in a terminal configured with a PCell operating in a TDD mode and an SCell operating in an FDD mode. The method includes: performing controlling to be cross-carrier scheduled about the SCell; receiving control information for PUSCH transmission in the SCell from the PCell; transmitting, in the SCell, a PUSCH based on the control information; and receiving, in the PCell, a PHICH regarding the PUSCH transmitted based on PHICH timing of the SCell.

The present disclosure also provides a method of processing a PHICH in a terminal configured with a PCell operating in an FDD mode and an SCell operating in a TDD mode. The method includes: performing controlling to be cross-carrier scheduled about the SCell; receiving control information for PUSCH transmission in the SCell from the PCell; transmitting, in the SCell, a PUSCH based on the control information; and receiving, in the PCell, a PHICH regarding the PUSCH transmitted based on PHICH timing of the SCell.

The present disclosure also provides a method of transmitting, in a base station, a PHICH to a terminal configured with a PCell and an SCell operating in different duplex modes. The method includes: controlling each of the PCell and the SCell to be self-carrier scheduled; transmitting control information for PUSCH transmission in each of the PCell and the SCell of the terminal; receiving a PUSCH transmitted in each of the PCell and the SCell based on the control information; and transmitting a PHICH regarding the PUSCH to each of the PCell and the SCell, based on PHICH timing of each of the PCell and the SCell in response to the PUSCH transmission.

The present disclosure also provides a method of transmitting, by a base station, a PHICH to a terminal configured with a PCell operating in a TDD mode and an SCell operating in an FDD mode. The method includes: controlling to be cross-carrier scheduled about the SCell; transmitting control information for PUSCH transmission to the PCell; receiving a PUSCH transmitted in the SCell based on the control information; and transmitting a PHICH regarding the PUSCH to the PCell, based on PHICH timing of the SCell.

The present disclosure also provides a method of transmitting, in a base station, a PHICH to a terminal configured with a PCell operating in an FDD mode and an SCell operating in a TDD mode. The method includes: controlling to be cross-carrier scheduled about the SCell; transmitting control information for PUSCH transmission to the PCell; receiving a PUSCH transmitted in the SCell based on the control information; and transmitting a PHICH regarding the PUSCH to the PCell, based on PHICH timing of the SCell.

The present disclosure also provides a terminal configured with a PCell and an SCell operating in different duplex modes. The terminal may process a PHICH. Such a terminal includes: a controller configured to perform controlling the PCell and the SCell to be self-carrier scheduled; a receiver configured to receive control information from the PCell or the SCell; and a transmitter configured to transmit a PUSCH from the PCell or the SCell based on the control information. The receiver is configured to receive a PHICH regarding the PUSCH transmitted from each of the PCell and the SCell based on PHICH timing of each of the PCell and the SCell in response to the PUSCH transmission.

The present disclosure also provides a terminal configured with a PCell operating in a TDD mode and an SCell operating in an FDD mode. Such a terminal may process a PHICH. The terminal includes: a controller configured to perform controlling to be cross-carrier scheduled about the SCell; a receiver configured to receive, in the PCell, control information for PUSCH transmission from the SCell; and a transmitter configured to transmit a PUSCH from the SCell based on the control information. The receiver is configured to receive the PHICH regarding the PUSCH transmitted from the PCell based on PHICH timing of the SCell.

The present disclosure also provides a terminal configured with a PCell operating in an FDD mode and an SCell operating in a TDD mode. The terminal may process a PHICH. The terminal includes: a controller configured to perform controlling to be cross-carrier scheduled about the SCell; a receiver configured to receive, in the PCell, control information for PUSCH transmission from the SCell; and a transmitter configured to transmit a PUSCH from the SCell based on the control information. The receiver is configured to receive the PHICH regarding the PUSCH transmitted from the PCell based on PHICH timing of the SCell.

The present disclosure also provides a base station for transmitting a PHICH to a terminal configured with a PCell and an SCell operating in different duplex modes. The base station includes: a controller configured to control each of the PCell and the SCell to be self-carrier scheduled; a transmitter configured to transmit control information for PUSCH transmission from each of the PCell and the SCell; and a receiver configured to receive a PUSCH transmitted from each of the PCell and the SCell based on the control information. The transmitter is configured to transmit a PHICH regarding the PUSCH to each of the PCell and the SCell based on PHICH timing of the PCell or the SCell.

The present disclosure also provides a base station for transmitting a PHICH to a terminal configured with a PCell operating in a TDD mode and a SCell operating in an FDD mode. The base station includes: a controller configured to perform controlling to be cross-carrier scheduled about the SCell; a transmitter configured to transmit control information for PUSCH transmission to the PCell; and a receiver configured to receive a PUSCH transmitted from the SCell based on the control information. The transmitter is configured to transmit a PHICH regarding the PUSCH to the PCell based on PHICH timing of the SCell.

The present disclosure also provides a base station for transmitting a PHICH to a terminal configured with a PCell operating in an FDD mode and a SCell operating in a TDD mode. The base station includes: a controller configured to perform controlling to be cross-carrier scheduled about the SCell; a transmitter configured to transmit control information for PUSCH transmission to the PCell; and a receiver configured to receive a PUSCH transmitted from the SCell based on the control information. The transmitter transmits a PHICH regarding the PUSCH to the PCell based on PHICH timing of the SCell.

Advantageous Effects

According to the present disclosure as set forth above, the terminal and the base station performing the aggregation of carriers operating in different duplex modes may remove the ambiguity of procedures operating according to the establishment of the PCell and the SCell.

In addition, according to the present disclosure, it is possible to improve the reliability of data transmission and reception due to carrier aggregation (CA) by improving the accuracy of the transmission and reception operations of an UL control channel and a DL control channel including an HARQ-ACK operation.

DESCRIPTION OF DRAWINGS

FIG. 8 is a table illustrating UL-DL configurations in a TDD frame structure.

FIG. 9 is a table illustrating PDCCH/EPDCCH timing for TDD UL transmission in TDD UL-DL configurations.

FIG. 10 is a table illustrating PHICH timing for TDD UL HARQ-ACK transmission in TDD UL-DL configurations.

FIG. 11 to FIG. 17 illustrate exemplary cases in which a TDD cell and an FDD cell are subjected to CA, the TDD cell having TDD UL-DL configurations 0 to 6 for TDD-FDD joint operation and CA.

FIG. 18 is an exemplary table illustrating the timing relationship of the PDCCH/EPDCCH for UL data transmissions in the TDD PCell according to the embodiment of the present disclosure.

FIG. 19 and FIG. 20 are tables illustrating exemplary timing relationships of the PDCCH/EPDCCH when TDD UL-DL configuration 0 is a PCell according to another embodiment of the present disclosure.

FIG. 21 is a table illustrating exemplary PHICH timing according to UL-DL configurations in a TDD PCell according to further another embodiment of the present disclosure.

FIG. 22 and FIG. 23 are tables illustrating exemplary PHICH timing relationships when a PCell has TDD UL-DL configuration 0 according to another embodiments of the present disclosure.

BEST MODE

Figure 1:
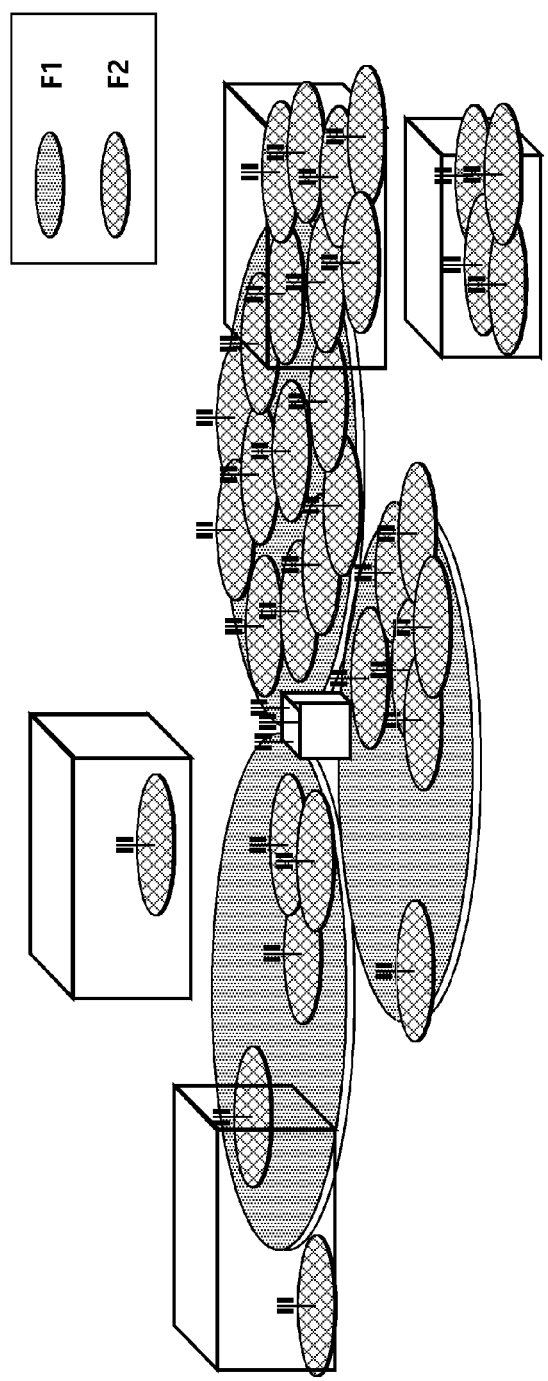
FIG. 1 is a diagram illustrating a small cell deployment according to an embodiment.

Reference will now be made in detail to embodiments of the present disclosure, examples of which are illustrated in the accompanying drawings. Throughout this document, reference should be made to the drawings, in which the same reference numerals and signs will be used to designate the same or like components. In the following description of the present disclosure, detailed descriptions of known functions and components incorporated herein will be omitted in the case that the subject matter of the present disclosure may be rendered unclear thereby.

Herein, a wireless communications system may be widely distributed in order to provide various types of communications services, such as a voice conversation service, a data packet service, or the like. Here, a wireless communications system includes sets of user equipment (UE) and base stations (BSs) or evolved node Bs (eNBs). As used in the specification, the term "user equipment" has a comprehensive meaning indicating a wireless communications terminal, and should be interpreted as not only indicating the user equipment in the wideband code division multiple access (WCDMA) scheme, the long-term evolution (LTE) scheme, the high speed packet access (HSPA) scheme, and the like, but also including all of a mobile station (MS), a user terminal (UT), a subscriber station (SS), a wireless device, and the like, in the global system for mobile communications (GSM) scheme.

A base station or a cell typically refers to a station that communicates with the user equipment. The base station may be referred to using another term, such as a node-B, an evolved node-B (eNB), a sector, a site, a base transceiver system (BTS), an access point, a relay node, a remote radio head (RRH), a radio unit (RU), a small cell, or the like.

Specifically, in the specification, the base station or cell should be interpreted as having a comprehensive meaning indicating a partial area or a function covered by a base station controller (BSC), a node-B in the WCDMA scheme, an eNB or a sector (site) in the LTE scheme, or the like. The base station or cell comprehensively includes a variety of coverage areas, such as a mega cell, a macro cell, a microcell, a picocell, a femtocell, and a variety of communications ranges of a relay node, an RRH, an RU, and a small cell.

Each of the variety of cells as enumerated above is controlled by a base station, and the base station may be interpreted in two senses. The base station i) may be an apparatus that provides a mega cell, a macro cell, a microcell, a picocell, a femtocell, or a small cell in relation to a wireless area, or ii) may indicate the wireless area itself. In i), entire apparatuses providing wireless areas are controlled by the same entity or entire apparatuses interacting with one another to form a wireless area in a coordinated manner are referred to as base stations. An eNB, an RRH, an antenna, an RU, a low power node (LPN), a point, a transceiver point, a transmission point, a reception point, and the like form embodiments of the base station, depending on the configuration of the wireless area. In ii), in terms of a user or in terms of an adjacent base station, the wireless area in which a signal is received or transmitted may be referred to as a base station.

Thus, the mega cell, the macro cell, the microcell, the picocell, the femtocell, the small cell, the RRH, the antenna, the RU, the LPN, the point, the eNB, the transceiver point, the transmission point, and the reception point are collectively referred to as the base stations.

In the specification, the user equipment and the base station are comprehensively referred to as two types of transmission/reception entities for realizing technologies or technical concepts described herein and are not limited by terms or words that are explicitly defined. The user equipment and the base station are comprehensively used as two transmission/reception (uplink and downlink) entities for realizing technologies or technical concepts described herein and are not limited by terms or words that are explicitly defined. Here, the term "uplink (UL)" relates to data transmission/reception in which data is transmitted from the user equipment to the base station, whereas the term "downlink (DL)" relates to data transmission/reception in which data is transmitted from the base station to the user equipment.

There are no limitations in multiple access technologies applied to the wireless communications system. A variety of multiple access methods, such as code division multiple access (CDMA), time division multiple access (TDMA), frequency division multiple access (FDMA), orthogonal frequency division multiple access (OFDMA), OFDM-FDMA, OFDM-TDMA, and OFDM-CDMA, may be used. An exemplary embodiment of the present disclosure is applicable for the allocation of resources in asynchronous wireless communications evolving into long-term evolution (LTE) and LTE-Advanced through GSM, WCDMA, and high speed packet access (HSPA) and synchronous wireless communications evolving into CDMA, CDMA-2000, and ultra mobile broadband (UMB). The present disclosure should not be interpreted as being limited or restricted to a specific field of wireless communications and should be interpreted as including all technical fields to which the concept of the present disclosure is applicable.

Uplink (UL) transmission and downlink (DL) transmission may employ time division duplex (TDD) in which transmission is performed at different fractions of time or frequency division duplex (FDD) in which transmission is performed at different fractions of time.

In addition, a system such as LTE or LTE-Advanced forms a standard by forming a UL and a DL based on a single carrier wave or a pair of carrier waves. Each of the UL and the DL transmits control information through a control channel, such as a physical downlink control channel (PDCCH), a physical control format indicator channel (PCFICH), a physical hybrid-ARQ indicator channel (PHICH), a physical uplink control channel (PUCCH), and an enhanced physical downlink control channel (EPDCCH). In addition, each of the UL and the DL are constituted of a data channel, such as a physical downlink shared channel (PDSCH) or a physical uplink shared channel (PUSCH), to transmit data.

Alternatively, it is possible to transmit control information using an enhanced or extended PDCCH (EPDCCH).

In the specification, the cell may refer to a transmission or transmission/reception point, the coverage of a signal transmitted from the transmission or transmission/reception point, or a component carrier having the coverage of the signal transmitted from the transmission or transmission/reception point.

The wireless communication system to which embodiments are applied may be a coordinated multi-point transmission/reception System (CoMP) system, in which two or more transmission/reception points transmit a signal in a coordinated manner, a coordinated multi-antenna transmission system, or a coordinated multi-cell communications system. The CoMP system may include at least two multi-transmission/reception points and terminals.

The multi-transmission/reception points may be a base station or a macro cell (hereinafter referred to as an "eNB") and at least one RRH connected to the eNB via a fiber optic cable or a optical fiber and controlled by wires. The RRH has high transmission power, or has low transmission power within the area of the macro cell.

Hereinafter, the DL refers to communications from each multi-transmission/reception point to the terminal or a path for such communications. The UL refers to communications from the terminal to the multi-transmission/reception point or a path for such communications. In the DL, a transmitter may be a portion of the multi-transmission/reception point, and a receiver may be a portion of the terminal. In the UL, the transmitter may be a portion of the terminal, and the receiver may be a portion of the multi-transmission/reception point.

Hereinafter, when a signal is transmitted/received via a channel, such as the PUCCH, PUSCH, PDCCH, EPDCCH, or physical PDSCH, it may be described that "a PUCCH, PUSCH, PDCCH, EPDCCH, or PDSCH is transmitted/received."

In addition, hereinafter, transmitting or receiving a PDCCH or transmitting or receiving a signal on the PDCCH may refer to transmitting or receiving an EPDCCH or transmitting or receiving a signal on the EPDCCH.

That is, the PDCCH described hereinafter indicates the PDCCH or the EPDCCH, or is used as including both the PDCCH and the EPDCCH.

For the sake of convenience of explanation, the EPDCCH may be applied as an embodiment of the present disclosure to the portion described as being the PDCCH, and the PDCCH may be applied as an embodiment of the present disclosure to the portion described as being the EPDCCH.

In the meantime, high layer signaling described hereinafter includes radio resource control (RRC) signaling that transmits RRC information including an RRC parameter.

The eNB performs DL transmission to terminals. The eNB may transmit a physical downlink shared channel (PDSCH), which is a main channel for unicast transmission, and a physical downlink control channel (PDCCH), on which DL control information, such as scheduling necessary for the reception of the PDSCH, and scheduling approval information for transmission on a UL data channel (e.g. a physical uplink shared channel (PUSCH)) are transmitted. Hereinafter, the transmission of a signal on each channel will be described as the transmission of the relevant channel.

A small cell using a low-power node is considered as a means for dealing with rapid increases in the amount of mobile traffic. The low-power node refers to a node that uses lower transmission (Tx) power than typical macro-nodes.

According to carrier aggregation (CA) technology before 3GPP Release 11, it was possible to construct a small cell using a low-power remote radio head (RRH), i.e. one of geographically dispersed antennas, within the coverage area of a macro cell.

However, for the application of the above-mentioned CA technology, the macro cell and the RRH cell are constructed in such a manner as to be scheduled under the control of a single base station. Here, it is necessary to construct an ideal backhaul between the node of the macro cell and the RRH.

The ideal backhaul refers to a backhaul exhibiting a very high throughput and a very short time delay, as in a dedicated point-to-point (PTP) connection using optical fibers or a line-of-sight (LOS) microwave link.

In contrast, a backhaul, such as a digital subscriber line (xDSL) or a non-LOS microwave link, exhibiting a relatively low throughput and a relatively long delay is referred to as a non-ideal backhaul.

A plurality of serving cells may be aggregated using the above-mentioned CA technology, based on a single base station, to provide a service to a terminal. That is, a plurality of serving cells may be provided for a radio resource control (RCC)-connected terminal. When the ideal backhaul is constructed between the node of the macro cell and the RRH, both the macro cell and the RRH cell may be provided as serving cells to provide a service to the terminal.

When the CA technology based on a single base station is formed, the terminal may have a single RRC connection with the network.

In RRC connection establishment, reestablishment, and handover, a single serving cell provides non-access stratum (NAS) mobility information (e.g. tracking area identity (TAI)). In RRC connection reestablishment and handover, a single cell provides a security input. This cell is referred to as the primary cell (PCell). Depending on terminal capabilities, a secondary cell (SCell) may form the serving cell together with the PCell.

The present disclosure relates to a method and apparatus for operating a terminal and a method and apparatus for enabling a base station to use the same method, in which the terminal belonging to the relevant base station is enabled to support a joint operation between TDD and TDD, in case a small cell and at least one of a cell, a base station, an RRH, an antenna, and an RU in a multi-cell structure support different duplex modes, i.e. FDD and TDD. In addition, the present disclosure relates to a method and apparatus for establishing control channel and PUSCH transmission/reception timing and hybrid automatic repeat request-acknowledgement (HARQ-ACK) timing regarding the CA and joint operation between the macro cell and the small cell and the UL transmission of the terminal in case respective duplex modes are used in a macro cell, a small cell, and at least one of a cell, a base station, an RRH, an antenna, and an regardless of the duplex modes.

Hereinafter, a small cell deployment scenario to which proposals of the present disclosure are applicable will be described.

FIG. 1 is a diagram illustrating a small cell deployment according to an embodiment.

FIG. 1 illustrates a configuration where small cells and macro cells coexist. This configuration will be divided more specifically in FIG. 2 and FIG. 3 below, depending on whether or not a macro coverage area is present, whether or not a relevant small cell is intended to be situated outdoors or indoors, whether or not the deployment of the relevant small cell is sparse or dense, and whether or not the same frequency spectrum as that of the macro coverage area is used, in terms of spectrum. Detailed scenario configurations will be described with reference to FIG. 2 to FIG. 6.

Figure 2:
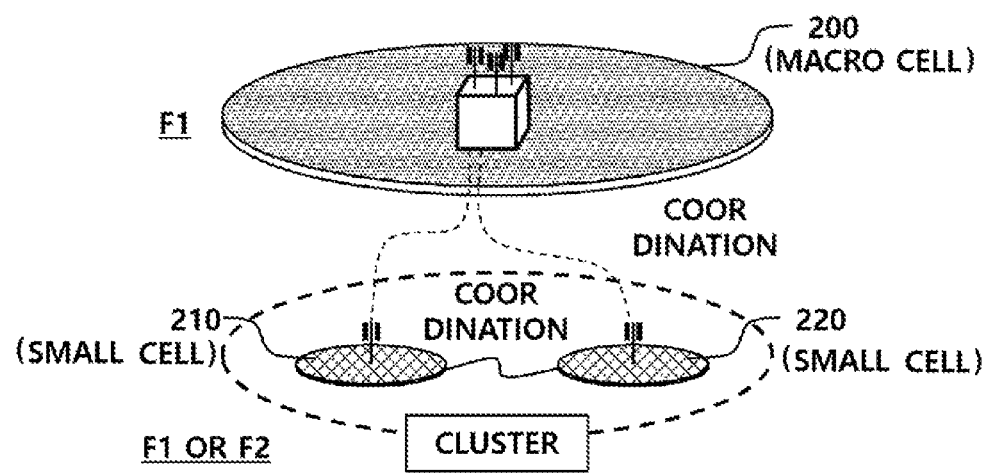
FIG. 2 is a diagram illustrating small cell deployment scenarios.

FIG. 2 is a diagram illustrating small cell deployment scenarios. FIG. 2 represents a general representative configuration of scenarios illustrated in FIG. 3 to FIG. 6. FIG. 2 illustrates the small cell deployment scenario including scenarios #1, #2a, #2b, and #3. A reference numeral 200 indicates a macro cell, and 210 and 220 indicate small cells. In FIG. 2, an overlaid cell may be present or absent. Coordination may be performed between the macro cell and the small cells 210 and 220, and coordination may be performed between the small cells 210 and 220. Overlaid areas of 200, 210, and 220 may be bound as clusters.

FIG. 3 to FIG. 6 are views illustrating specific scenarios in the small cell deployment.

Figure 3:
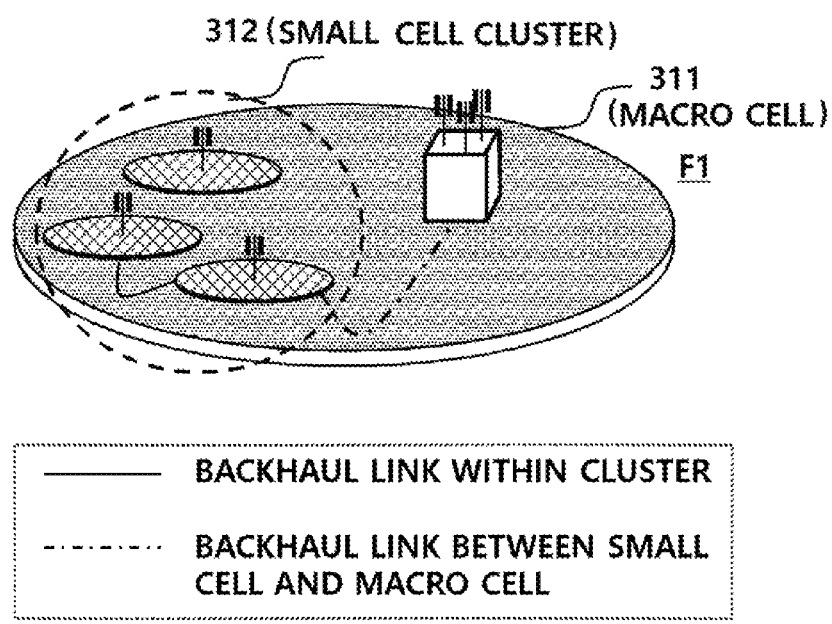
FIG. 3 to FIG. 6 are views illustrating specific scenarios in a small cell deployment.

FIG. 3 illustrates a small cell deployment scenario #1 in the small cell deployment. The small cell deployment scenario #1 is a co-channel deployment scenario of small cells and a macro cell when an overhead macro is present, and is an outdoor small cell scenario. A reference numeral 310 indicates a case in which both a macro cell 311 and small cells are outdoor cells, and a reference numeral 312 indicates a small cell cluster. All users are distributed indoors and outdoors.

A solid line connecting the small cells in the small cell cluster 312 indicates a backhaul link within the cluster. A dot-dash line connecting a base station of the macro cell and a small cell among the small cells within the cluster indicates a backhaul link between the small cell and the macro cell.

Figure 4:
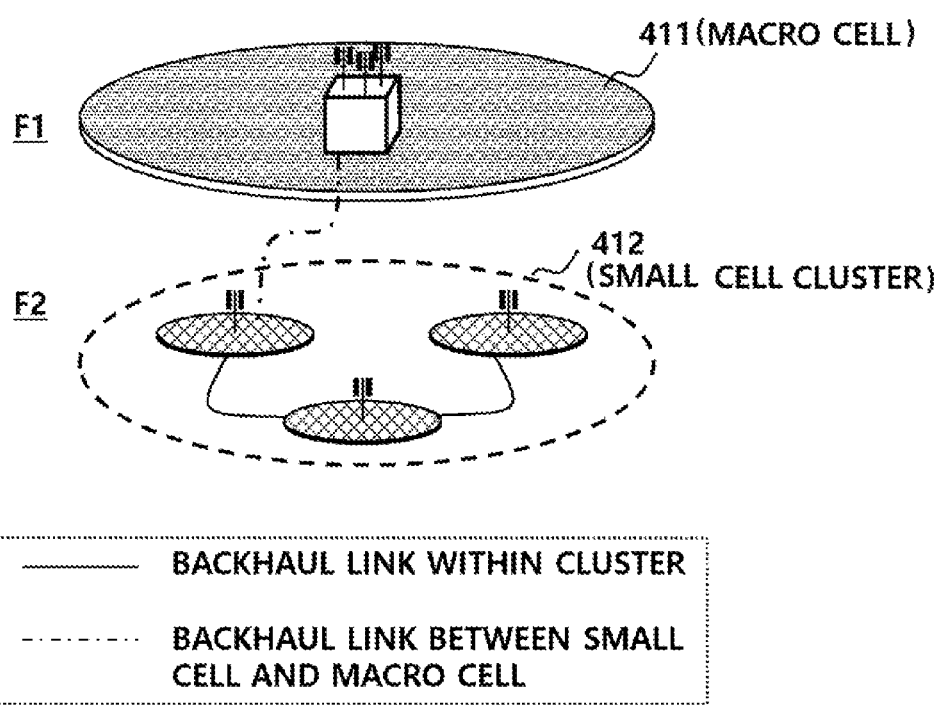

FIG. 4 illustrates small cell deployment scenario #2a. The small cell deployment scenario #2a is a deployment scenario in which small cells and a macro cell use different frequency spectra in the presence of an overlaid macro cell, and is an outdoor small cell scenario. All of the macro cell 411 and the small cells are situated outdoors, and a reference numeral 412 indicates a small cell cluster. All users are distributed indoors and outdoors.

Solid lines connecting the small cells within the small cell cluster 412 indicate backhaul links within the cluster. A dot-dash line connecting a base station of the macro cell and a small cell among the small cells within the cluster indicates a backhaul link between the small cell and the macro cell.

Figure 5:
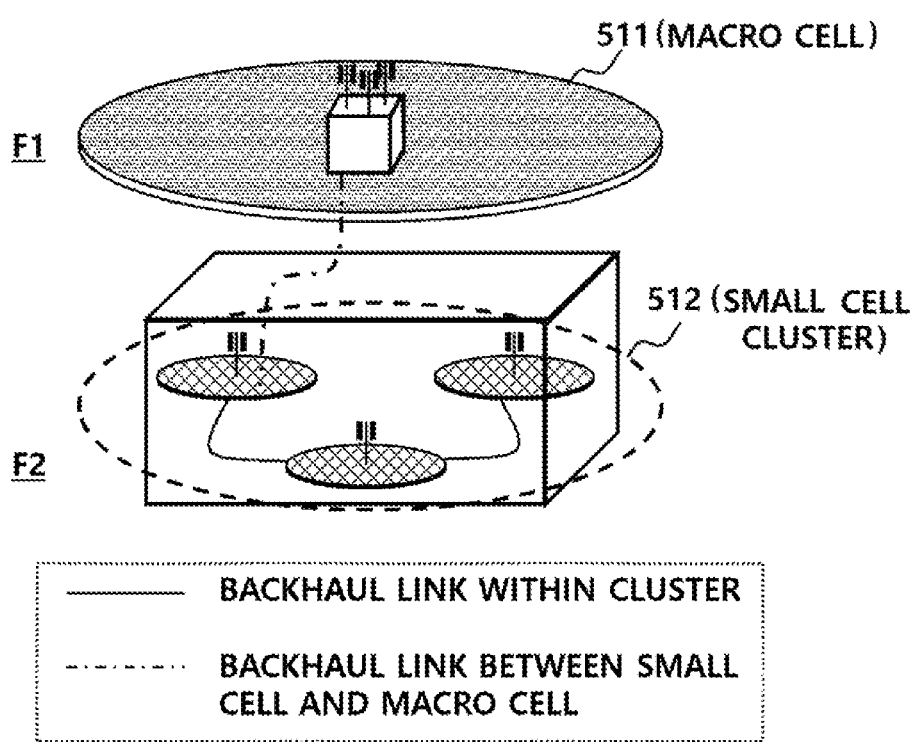

FIG. 5 illustrates small cell deployment scenario #2b. The small cell deployment scenario #2b is a deployment scenario in which small cells and a macro cell use different frequency spectra in the presence of an overlaid macro cell, and is an indoor small cell scenario. The macro cell 511 is situated outdoors, the entire small cells are situated indoors, and the reference numeral 512 indicates a small cell cluster. All users are distributed indoors and outdoors.

Solid lines connecting the small cells within the small cell cluster 512 indicate backhaul links within the cluster. A dot-dash line connecting a base station of the macro cell and a small cell among the small cells within the cluster indicates a backhaul link between the small cell and the macro cell.

Figure 6:
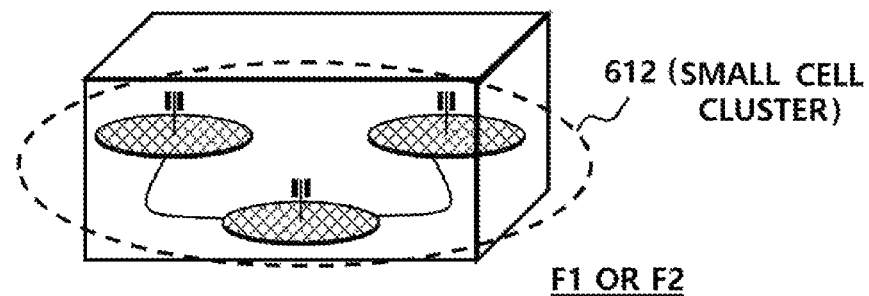

FIG. 6 illustrates small cell deployment scenario #3. The small cell deployment scenario #3 is an indoor small cell scenario in case there is no macro coverage area. A reference numeral 612 indicates a small cell cluster. All small cells are situated indoors, and all users are distributed indoors and outdoors.

Solid lines connecting the small cells within the small cell cluster 612 indicate backhaul links within the cluster. Dot-dash lines connecting a base station of a macro cell and the small cells within the cluster indicate backhaul links between the small cells and the macro cell.

Frequencies F1 and F2 used in FIG. 1 and in the variety of small cell scenarios of FIG. 2 to FIG. 6 as described above may be frequencies supporting the same duplex mode or may have different duplex modes. For example, the frequency F1 may be a frequency supporting FDD mode, and the frequency F2 may be a frequency supporting TDD mode, and vice versa.

Figure 7:
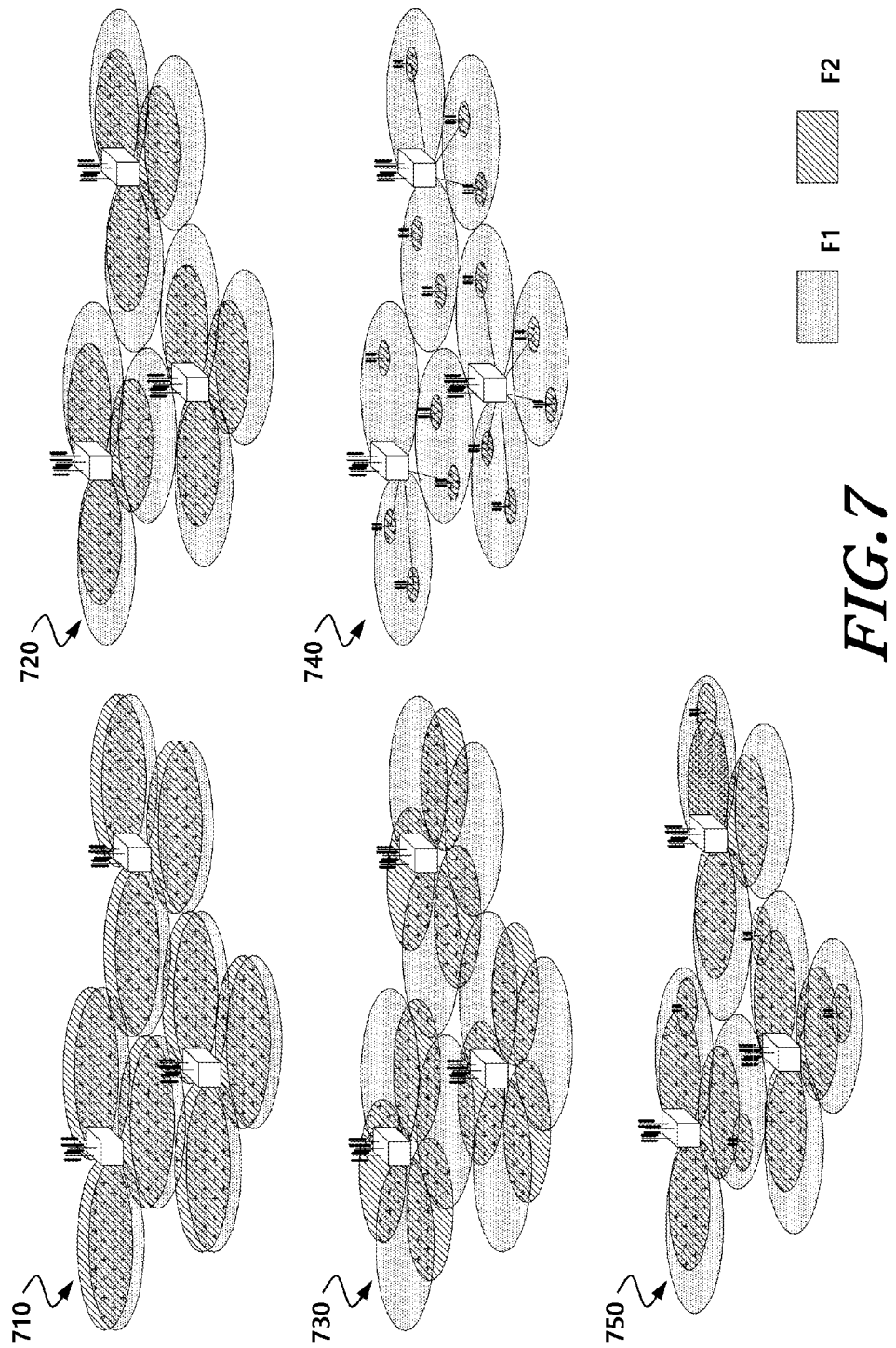
FIG. 7 is a diagram illustrating a variety of scenarios in carrier aggregation (CA).

FIG. 7 is a diagram illustrating a variety of scenarios in carrier aggregation (CA).

In the CA illustrated in FIG. 7, the frequencies F1 and F2 may be considered to be frequencies supporting the same duplex mode or frequencies supporting different duplex modes.

In a scenario 710, F1 and F2 cells are overlaid while being co-located in substantially the same coverage areas. Two layers are scenarios that provide sufficient coverage areas and mobility, and cell aggregation between overlaid F1 and F2 cells is possible.

A reference numeral 720 indicates a scenario in which F1 and F2 cells are co-located and overlaid, in which each coverage area of the frequency F2 is smaller than the relevant coverage area of the frequency F1. The frequency F1 has sufficient coverage areas, and mobility support is performed based on the coverage areas of the frequency F1. The frequency F2 is a scenario used to improve throughput. In this scenario, cell aggregation between overlaid F1 and F2 cells is possible.

A reference numeral 730 indicates a scenario in which F1 and F2 cells are co-located but F2 antennas are directed to cell boundaries in order to improve cell edge throughputs. In this scenario, mobility support is performed based on the coverage areas of the frequency F1. Although the frequency F1 has sufficient coverage areas, the frequency F2 has temporary coverage holes. In the same eNB, the F1 and F2 cells may be aggregated in the overlaid coverage areas.

A reference numeral 740 indicates a scenario in which the frequency F1 has macro coverage areas and RRHs are used in the frequency F2 in order to improve throughputs in hot spots. Mobility support is performed based on the coverage areas of the frequency F1. The cells of the RRHs of F2 may be aggregated with F1 macro cells.

A reference numeral 750 indicates a scenario in which each of frequency selective repeaters is deployed in order to expand the coverage area of a single carrier, like the scenario 720. In this scenario, the F1 and F2 cells in the same eNB may be aggregated in the overlaid coverage areas.

In the specification, if a terminal has dual connectivity, a base station that forms an RRC connection with the terminal and provides a cell (e.g. a PCell) based on which handover is performed or a base station that terminates an Si-mobility management entity (S1-MME) and serves as a mobility anchor for a core network is described as a master base station or a first base station.

The master base station or the first base station may be a base station that provides a macro cell, or in the case of a dual connectivity deployment between small cells, provides any one of the small cells.

In the meantime, a base station that provides additional wireless resources to the terminal, distinguished from the master base station in the dual connectivity deployment, is described as a secondary base station or a second base station.

Each of the first base station (e.g., master base station) and the second base station (e.g., secondary base station) may provide at least one cell to the terminal, and the first base station and the second base station may be connected to each other through an interface therebetween.

In addition, for a better understanding, a cell related to the first base station may be described as being a macro cell, and a cell related to the second base station may be described as being a small cell. Alternatively, in the above-described small cell cluster scenario, the cell related to the first base station may be described as being a small cell.

In the present disclosure, the macro cell may refer to a cell or each of at least two cells, or may be described as representing entire cells related to the first base station. In addition, the small cell may refer to a cell or each of at least two cells, or may be described as representing entire cells related to the second base station. Alternatively, the small cell may be a cell related to the first base station in a specific scenario, as of a small cell cluster as described above. In this case, a cell of the second base station may be described as being an additional small cell or a further small cell.

In the following description of embodiments, for the sake of convenience of explanation, the macro cell may be related to the master base station or the first base station, and the small cell may be related to the secondary base station or the second base station. However, the present disclosure is not limited thereto, and embodiments of the present disclosure may be applied to a case in which the secondary base station or the second base station is related to the macro cell and the master base station or the first base station is related to the small cell.

In case carrier aggregation (CA) is supported, CA in each of the FDD and TDD duplex modes may be considered. When CA in the same mode as in FDD or TDD is considered, it may be established such that component carriers (CCs) are divided as below.

First, a primary cell (PCell) will be described.

When CA is formed, the terminal has a single RRC connection with a network. In the case of RRC connection establishment, reestablishment, and handover, a single serving cell provides NAS mobility information. In the case of RRC connection reestablishment and handover, a single serving cell provides a security input. This cell is referred to as the PCell. In a DL, a carrier corresponding to the PCell is a downlink primary component carrier (DL PCC). In a UL, the carrier corresponding to the PCell is an uplink primary component carrier (UL PCC).

The PCell may only be changed by a handover procedure, and the PCell is used for the transmission of a PUCCH. In addition, the PCell cannot be de-activated unlike an SCell. The reestablishment is triggered when the PCell experiences a radio link failure (RLF) but is not triggered when the SCell experiences the RLF. In addition, NAS information is obtained from the PCell.

In subsequence, the secondary cells (SCells) will be described.

The SCells may form a set of serving cells together with the PCell, in dependence on terminal capability. A carrier corresponding to an SCell in a DL is a DL secondary component carrier (DL SCC), and a carrier corresponding to an SCell in a UL is a UL secondary component carrier (UL SCC).

Three serving cells among the set of serving cells formed for a single terminal constantly include a single PCell and one or more SCells. The number of serving cells depends on the aggregation capability of the terminal.

SCells may be reestablishment (reconfigured), added, and removed through RRC. The SCells may be reestablished, added, or removed through RRC in order to be used together with a target PCell during intra-LTE handover. When a new SCell is added, dedicated RRC signaling is used in order to transmit the entire system information of the SCell as requested. In a connected mode, the terminal is not required to directly obtain broadcast system information from the SCells.

FIG. 8 is a table illustrating TDD UL-DL configurations in a TDD frame structure. In the table of FIG. 8, D indicates DL subframes, U indicates UL subframes, and S indicates special subframes.

FIG. 9 is a table illustrating PDCCH/EPDCCH timing for TDD UL transmissions in TDD UL-DL configurations.

FIG. 9 represents PDCCH/EPDCCH timing for TDD UL transmissions in the existing TDD UL-DL configurations. This indicates that a PUSCH is transmitted on the $(n+k)^{th}$ subframe regarding a PDCCH/EPDCCH on the relevant $n^{th}$ subframe.

For example, regarding a PDCCH/EPDCCH detected on subframe 0 in TDD UL-DL configuration 0, a PUSCH may be transmitted on subframe 4.

FIG. 10 is a table illustrating PHICH timing for TDD UL HARQ-ACK transmissions in TDD UL-DL configurations.

FIG. 10 represents PHICH transmission timing for TDD UL HARQ-ACK transmissions in the existing TDD UL-DL configurations. In PHICH timing regarding HARQ-ACK transmissions for a PUSCH transmitted on subframe, a PHICH may be transmitted on the $(n+k\_PHICH)^{th}$ DL subframe.

In order to efficiently transmit and receive data, carrier aggregation (CA) in each of the FDD and TDD duplex modes is considered. However, neither the joint operation nor CA between different duplex modes, i.e. FDD and TDD, proposed in the present disclosure has been considered.

Therefore, the present disclosure proposes a specific method and apparatus for PHICH timing for the transmission of an HARQ-ACK regarding UL transmissions if the joint operation and the CA of different FDD and TDD duplex modes are considered.

Specifically, embodiments of the present disclosure are applicable in case a base station considers the joint operation of different duplex modes, i.e. FDD and TDD, and CA of FDD and TDD on a terminal. In this case, the terminal and the base station may operate differently from the case in which CA is performed in the same duplex mode as in the related art. For example, it is necessary to differently define PHICH timing in which an HARQ-ACK in regarding UL transmission is transmitted. Thus, proposed are a method of operating a terminal in a relevant case, a method of establishing the operation of a terminal by a base station, and a terminal apparatus and a base station apparatus related thereto.

Hereinafter, according to the respective embodiments, proposed are methods of operating a terminal and a base station regarding PHICH timing in which an HARQ-ACK is transmitted in response to a UL transmission in case the joint operation and CA of different FDD and TDD duplex modes are considered.

First, the present disclosure describes a method of PHICH timing for the transmission of an HARQ-ACK in response to UL transmissions that may vary depending on the duplex modes of the cells designated as a PCell and an SCell in the TDD-FDD joint operation and CA.

The present disclosure defines UE procedures regarding UL transmission timing for a PDCCH/EPDCCH and PHICH timing regarding the transmission of a related HARQ-ACK in the TDD-FDD joint operation and CA.

In descriptions of the aggregation of carriers operating in different duplex modes or the joint operation of carriers operating in different duplex modes, the following embodiments may be divided depending on the duplex modes of the PCell and the SCell.

TDD PCell and FDD SCell

While a TDD DL subframe designated for the TDD PCell is present in a specific subframe according to UL-DL configurations, all UL subframes for the FDD SCell are present in a single radio frame. In the case of non-cross-carrier scheduling, each of the TDD PCell and the FDD SCell performs self-carrier scheduling. Consequently, the TDD PCell and the FDD SCell may suitably operate as independent serving cells when a control channel (PDCCH/EPDCCH) timing for UL transmission and PHICH timing for transmitting an HARQ-ACK For example, in a method of processing a PHICH by a terminal in which a PCell and an SCell operating in different duplex modes are configured, a PHICH regarding a PUSCH transmitted in each of the PCell and the SCell may be received in the PHICH timing of each of the cells that has transmitted the PUSCH. Thus, when the PCell and the SCell are subjected to self-carrier scheduling, the PHICH regarding the PUSCH transmitted in each of the PCell and the SCell may be transmitted/received based on the PHICH timing of each of the PCell and the SCell.

In a terminal performing CA or a joint operation, cross-carrier scheduling is an operation in which one specific carrier performs scheduling by receiving and transmitting the control information of the other carriers. In addition, non-cross-carrier scheduling is an operation in which cross-carrier scheduling is not performed by one specific carrier because each carrier receives and transmits control information. Non-cross-carrier scheduling is also referred to as self-carrier scheduling since scheduling is performed by each carrier.

As described above, when the PCell is a TDD PCell and the SCell is an FDD SCell, in the case of self-carrier scheduling, the terminal and the base station may operate in PHICH timing according to the duplex modes thereof.

However, when cross-carrier scheduling is used, ambiguity may occur in the operation of the terminal and the base station. Specifically, cross-carrier scheduling is a technology only applicable to PCells according to the current standards. Thus, FDD SCell UL transmissions are controlled by transmitting a PDCCH/EPDCCH for UL transmission for the FDD SCell in the TDD PCell. When such a case occurs, it may be ambiguous for the terminal to transmit UL data in timing designated by the TDD PCell or based on the FDD timing relationship according to the FDD SCell.

For example, in HARQ timing regarding UL transmissions in the existing FDD SCell, a UL is transmitted on the $n^{th}$ subframe using a UL grant received from the existing $(n-4)^{th}$ subframe, and the PHICH timing of the HARQ-ACK transmitted on the $(n+4)^{th}$ subframe is used. Thus, cross-carrier scheduling has a problem in that, when the TDD PCell has no $(n-4)^{th}$ DL subframe with respect to the $n^{th}$ UL transmission, scheduling of the relevant UL using the PDCCH/EPDCCH is disabled.

In addition, similarly, there is a problem in that, when the TDD PCell has no $(n+4)^{th}$ DL subframe with respect to the $n^{th}$ UL transmission, a PHICH on which an HARQ-ACK regarding the relevant UL is transmitted cannot be received.

Thus, for a terminal allowing for the TDD-FDD joint operation and CA, it is necessary to have a method for improving i) timing for transmitting a UL grant that transmits the scheduling information of a PDCCH/EPDCCH for UL transmission regarding the relevant FDD SCell and ii) timing for transmitting PHICH that transmits an HARQ-ACK regarding the relevant UL transmission.

Hereinafter, embodiments of the present disclosure in which the duplex mode of the PCell is TDD and the duplex mode of the SCell is FDD will be described in detail.

First Embodiment

Method of Synchronizing Trimming of HARQ-ACK in Response to UL Transmitted to FDD SCell with Timing of TDD PCell According to the first embodiment of the present disclosure, when a terminal that has established a TDD PCell adds an FDD SCell for TDD-FDD joint operation and CA, the terminal may set up PDCCH/EPDCCH timing for UL transmissions regarding the FDD SCell according to the TDD PCell. In the meantime, a method of applying the timing of the TDD PCell as the PHICH timing on which the HARQ-ACK regarding the UL transmissions to the FDD SCell may be considered.

Specifically, regarding a PDCCH/EPDCCH that has scheduling information (e.g., grant) on the $(n-4)^{th}$ subframe established in the existing FDD-FDD CA of the FDD SCell, the terminal may transmit a PUSCH on the $n^{th}$ subframe. In addition, the terminal may establish PDCCH/EPDCCH timing and PHICH timing regardless of whether the relevant HARQ-ACK is established to be transmitted on the PHICH to the DL $(n+4)^{th}$ subframe, which is the PHICH transmission timing of the existing FDD. That is, the PDCCH/EPDCCH reception timing and the PHICH timing are applied to the FDD SCell. Here, the PDCCH/EPDCCH reception timing is for a TDD UL shared channel associated with UL-DL subframe configurations used by the TDD PCell, and the HARQ-ACK is transmitted in the PHICH timing. This scheme is applied as if the TDD SCell is added to the FDD SCell. That is, PUSCH transmissions of the SCell may be performed based on the timing of the UL-DL subframe configurations established to be used in the TDD PCell.

When the first embodiment of the present disclosure is applied in this manner, it is possible to reduce the problem in which there is no DL subframe of the TDD PCell for scheduling a UL of the $n^{th}$ subframe regarding the above-described FDD SCell or there is no DL subframe on the TDD PCell for receiving the PHICH of the HARQ-ACK regarding a UL transmitted on a specific subframe.

Second Embodiment

Method of Newly Setting PDCCH/EPDCCH and PHICH Timing in Response to UL Transmitted in FDD SCell According to UL-DL Configuration of TDD PCell In a specific UL-DL configuration established in a specific TDD PCell as in the above-described first embodiment, when PHICH timing regarding a UL signal transmitted on a UL subframe in an FDD SCell is synchronized with the timing of the TDD PCell, the subframe of the SCell may be wasted, which is problematic.

For example, when timing, in which a PDCCH/EPDCCH regarding a UL transmitted in the FDD SCell is received, and/or PHICH timing, in which an HARQ-ACK is received in response to a UL transmission, follows the timing of the PCell according to UL-DL configurations, UL subframes of the FDD SCell aligned with DL subframes of the TDD PCell for the UL transmission have a problem in that there is no timing data related to the PDCCH/EPDCCH and the PHICH, since the relevant subframes of the existing TDD PCell are DL subframes. That is, regarding the UL PUSCH to be transmitted using an FDD SCell UL subframe index, the same as the DL subframe index of the TDD PCell, there is neither scheduling grant timing nor PHICH timing from the TDD DL subframes. Thus, the terminal cannot transmit UL subframes of the relevant FDD SCell. This may reduce UL data transmission rates by about 40% to about 90%, according to UL-DL configurations assigned to each TDD PCell.

Specifically, subframes without timing in the FDD SCell according to TDD PCell configurations will be described with reference to the drawings.

FIG. 11 to FIG. 17 illustrate exemplary cases in which a TDD cell and an FDD cell are subjected to CA, the TDD cell having TDD UL-DL configurations 0 to 6 for TDD-FDD joint operation and CA.

Each of FIG. 11 to FIG. 17 represents an exemplary case in which the TDD cell and the FDD Cell are subjected to CA, the TDD cell having TDD UL-DL configurations 0 to 6 for TDD-FDD joint operation and CA. In addition, in the FDD Cell, the UL frequency bands of some subframes are hatched. In TDD-FDD joint operation and CA, the hatched subframes require additional establishment of PDCCH/EP-DCCH timing regarding FDD SCell UL transmissions and PHICH timing regarding an HARQ-ACK transmission in response to the FDD SCell UL transmission. That is, according to the above-described first embodiment, these subframes require new establishment regarding the PDCCH/EPDCCH timing and the PHICH timing in the FDD SCell.

FIG. 11 is a table illustrating a case in which a TDD Cell having TDD UL-DL configuration 0 and an FDD Cell are subjected to CA according to an embodiment of the present disclosure. Referring to FIG. 11, subframes of the TDD PCell, the indices of which are the same as those of subframes 0, 1, 5, and 6 of the FDD SCell, are established as DL or special subframes. Thus, when the FDD SCell is established to follow the PDCCH/EPDCCH timing and the PHICH timing of the TDD PCell according to the above-described first embodiment, UL signal transmissions cannot be performed on subframes 0, 1, 5, and 6 of the FDD Cell. Due to such a problem, the subframes of the FDD SCell may be wasted.

FIG. 12 is a table illustrating a case in which a TDD Cell having TDD UL-DL configuration 1 and an FDD Cell are subjected to CA according to an embodiment of the present disclosure. Referring to FIG. 12, subframes of the TDD PCell, the indices of which are the same as those of subframes 0, 1, 4, 5, 6, and 9 of the FDD SCell, are established as DL or special subframes. Thus, when the FDD SCell is established to follow the PDCCH/EPDCCH timing and the PHICH timing of the TDD PCell according to the above-described first embodiment, UL signal transmissions cannot be performed on subframes 0, 1, 4, 5, 6, and 9 of the FDD Cell. Due to such a problem, the subframes of the FDD SCell may be wasted.

FIG. 13 is a table illustrating a case in which a TDD Cell having TDD UL-DL configuration 2 and an FDD Cell are subjected to CA according to an embodiment of the present disclosure. Referring to FIG. 13, subframes of the TDD PCell, the indices of which are the same as those of subframes 0, 1, 3, 4, 5, 6, 8, and 9 of the FDD SCell, are established as DL or special subframes. Thus, when the FDD SCell is established to follow the PDCCH/EPDCCH timing and the PHICH timing of the TDD PCell according to the above-described first embodiment, UL signal transmissions cannot be performed on subframes 0, 1, 3, 4, 5, 6, 8, and 9 of the FDD Cell. Due to such a problem, the subframes of the FDD SCell may be wasted.

FIG. 14 is a table illustrating a case in which a TDD Cell having TDD UL-DL configuration 3 and an FDD Cell are subjected to CA according to an embodiment of the present disclosure. Referring to FIG. 14, subframes of the TDD PCell, the indices of which are the same as those of subframes 0, 1, 5, 6, 7, 8, and 9 of the FDD SCell, are established as DL or special subframes. Thus, when the FDD SCell is established to follow the PDCCH/EPDCCH timing and the PHICH timing of the TDD PCell according to the above-described first embodiment, UL signal transmissions cannot be performed on subframes 0, 1, 5, 6, 7, 8, and 9 of the FDD Cell. Due to such a problem, the subframes of the FDD SCell may be wasted.

FIG. 15 is a table illustrating a case in which a TDD Cell having TDD UL-DL configuration 4 and an FDD Cell are subjected to CA according to an embodiment of the present disclosure. Referring to FIG. 15, subframes of the TDD PCell, the indices of which are the same as those of subframes 0, 1, 4, 5, 6, 7, 8, and 9 of the FDD SCell, are established as DL or special subframes. Thus, when the FDD SCell is established to follow the PDCCH/EPDCCH timing and the PHICH timing of the TDD PCell according to the above-described first embodiment, UL signal transmissions cannot be performed on subframes 0, 1, 4, 5, 6, 7, 8, and 9 of the FDD Cell. Due to such a problem, the subframes of the FDD SCell may be wasted.

FIG. 16 is a table illustrating a case in which a TDD Cell having TDD UL-DL configuration 5 and an FDD Cell are subjected to CA according to an embodiment of the present disclosure. Referring to FIG. 16, subframes of the TDD PCell, the indices of which are the same as those of subframes 0, 1, 3, 4, 5, 6, 7, 8, and 9 of the FDD SCell, are established as DL or special subframes. Thus, when the FDD SCell is established to follow the PDCCH/EPDCCH timing and the PHICH timing of the TDD PCell according to the above-described first embodiment, UL signal transmissions cannot be performed on subframes 0, 1, 3, 4, 5, 6, 7, 8, and 9 of the FDD Cell. Such a problem causes a waste of the subframes of the FDD SCell.

FIG. 17 is a table illustrating a case in which a TDD Cell having TDD UL-DL configuration 6 and an FDD Cell are subjected to CA according to an embodiment of the present disclosure. Referring to FIG. 17, subframes of the TDD PCell, the indices of which are the same as those of subframes 0, 1, 5, 6, and 9 of the FDD SCell, are established as DL or special subframes. Thus, when the FDD SCell is established to follow the PDCCH/EPDCCH timing and the PHICH timing of the TDD PCell according to the above-described first embodiment, UL signal transmissions cannot be performed on subframes 0, 1, 5, 6, and 9 of the FDD Cell are disabled. Such a problem causes a waste of the subframes of the FDD SCell.

In case the FDD SCell is added as described above, when the SCell establishes the PDCCH/EPDCCH timing and the PHICH timing according to the configurations of the TDD PCell as in the above-described first embodiment, some of the UL subframes of the FDD SCell may operate abnormally.

In order to overcome such a shortcoming, the second embodiment of the present disclosure provides a method of newly defining PDCCH/EPDCCH transmission timing for additional UL transmissions regarding the UL of the relevant FDD SCell and HARQ-ACK PHICH timing for the UL.

In accordance with the second embodiment, a method may establish, in principle, timing of transmitting the PDCCH/EPDCCH in the TDD PCell for performing transmission on the $n^{th}$ UL subframe of the FDD SCell, such that a PUSCH transmission instructed due to the detection of the PDCCH/EPDCCH is performed on at least the $(n-4)^{th}$ preceding subframe of the TDD PCell. In addition, regarding the PHICH on which the HARQ-ACK in response to the PUSCH transmitted on the $n^{th}$ UL subframe is transmitted, the earliest PHICH transmission may be established to be transmitted on at least $(n+4)^{th}$ TDD PCell DL subframe. That is, the control channel, i.e. the PDCCH/EPDCCH, including UL grant information about the PUSCH transmitted to the FDD SCell can be received at an interval of 4 ms or 4 TTI from the relevant PUSCH.

Descriptions of the above-described second embodiment will be divided according to the timing relationship between the PUSCH transmitted in the FDD SCell and the PDCCH/EPDCCH including the UL grant and the timing relationship between the PUSCH and the PHICH.

Timing Relationship between PUSCH and PDCCH/EPDCCH Transmitted to SCell

FIG. 18 is an exemplary table illustrating the timing relationship of the PDCCH/EPDCCH for UL data transmissions in the TDD PCell according to the embodiment of the present disclosure.

Referring to FIG. 18, the PDCCH/EPDCCH for the FDD SCell PUSCH can be equally distributed and transmitted on TDD DL subframes. Specifically, after the detection of the PDCCH/EPDCCH on TDD PCell subframes, PUSCH transmission timing may be as in FIG. 18. This indicates that, in case the UL PDCCH/EPDCCH transmissions regarding the FDD SCell is performed in the TDD PCell (e.g., cross-carrier scheduling), the PUSCH is transmitted on the $(n+k)^{th}$ subframe in the FDD SCell by the PDCCH/EPDCCH detected on the relevant $n^{th}$ subframe in the TDD PCell.

For example, underlined k values according to respective TDD UL-DL configurations are portions that newly define addition timing in existing TDD configurations. That is, in the case of TDD UL-DL configuration 0, the PDCCH/EPDCCH received on subframe 0 was able to include PUSCH scheduling information on a fourth UL subframe, i.e. the $(n+4)^{th}$ UL subframe, of the TDD Cell. When the FDD SCell according to the present disclosure is added, subframe 0 in TDD UL-DL configurations may be configured by adding 5 as a k value in order to schedule the PUSCH in FDD subframe 5. Therefore, the PUSCH can be scheduled on subframe 5 of the FDD SCell, based on the PDCCH/EPDCCH received on subframe 0 of the TDD PCell.

FIG. 18 illustrates exemplary timing data of the PUSCH and the PDCCH/EPDCCH about the FDD SCell according to TDD UL-DL configurations. Thus, transmission timing data of the SCell according to TDD UL-DL configurations may be independent of each other. Although seven sets are represented in a single table for the sake of convenience of explanation, they may be separately defined. That is, PUSCH transmission timing data of the SCell according to TDD UL-DL configurations in FIG. 18 may be defined separately.

The definition of the PDCCH/EPDCCH timing for the PUSCH transmitted on the FDD SCell UL subframe, described above with reference to FIG. 18, is an example in which the PDCCH/EPDCCH for the FDD SCell PUSCH may be transmitted by being equally distributed on TDD DL subframes.

Alternatively, the PDCCH/EPDCCH timing for the FDD SCell PUSCH may be established such that the PDCCH/EPDCCH timing is allocated to a specific TDD DL subframe.

FIG. 19 and FIG. 20 are tables illustrating exemplary timing relationships of the PDCCH/EPDCCH when TDD UL-DL configuration 0 is a Pcell according to another embodiment of the present disclosure.

Referring to FIG. 19 and FIG. 20, when TDD UL-DL configuration 0 is the PCell, the PDCCH/EPDCCH for a UL PUSCH of the relevant FDD SCell may be concentrically allocated to a specific TDD DL subframe. For example, in the case of the TDD PCell having TDD UL-DL configuration 0 as in FIG. 19, k values of subframe 0 may be configured to be 4, 5, and 6. In this case, the PDCCH/EPDCCH received on subframe 0 may include the PUSCH scheduling information of the $(n+k)^{th}$ subframe. Therefore, the PDCCH/EPDCCH may include the PUSCH scheduling information of UL subframes 5 and 6 of the FDD SCell.

Alternatively, referring to FIG. 20, the PUSCH scheduling information of UL subframes 5 and 6 of the FDD SCell may be received on subframe 1 of the TDD PCell.

In this manner, control information for the scheduling of the PUSCH of UL subframes of the SCell, which has not been able to be scheduled through existing TDD UL-DL configurations, may be established to be concentrically allocated to a specific subframe of the TDD PCell.

Although TDD configuration 0 was described by way of example, the same principle may be applied to the other TDD UL-DL configurations. In the case of concentric allocation, subframe index information by which the relevant PUSCH is intended to be transmitted may be transmitted on the PDCCH/EPDCCH. That is, it is possible to establish the PUSCH to be transmitted on the relevant UL subframe by indicating a UL subframe index regarding the relevant FDD SCell with UL index information.

The methods of additionally setting the PUSCH timing and the PDCCH/EPDCCH timing in an equal or concentric manner have been described according to embodiments of the second embodiment of the present disclosure. Hereinafter, embodiments of the PHICH timing establishment according to the second embodiment of the present disclosure will be described.

Timing Relationship of PHICH with Respect to PUSCH Transmitted on FDD SCell

Under the principle of the second embodiment of the present disclosure as described above, the following embodiments will be described regarding the relationship of PHICH timing with respect to a PUSCH transmitted on an FDD SCell due to PDCCH/EPDCCH detection. As for the PHICH timing regarding the PUSCH transmission on the FDD SCell, the following embodiments may be provided. This indicates that, when a PHICH regarding a UL transmission on the FDD SCell is transmitted in the TDD PCell, the terminal receives the PHICH for an FDD SCell PUSCH on the relevant $(n+k\_PHICH)^{th}$ subframe in the TDD PCell in response to the PUSCH transmission on the $n^{th}$ subframe in the FDD SCell.

FIG. 21 is a table illustrating exemplary PHICH timing according to UL-DL configurations in a TDD PCell according to further another embodiment of the present disclosure.

Referring to FIG. 21, for example, when the TDD PCell is established as UL-DL configuration 0, a PHICH including an HARQ-ACK in response to a PUSCH transmitted on UL subframe 0 of the FDD SCell may be received on DL subframe 5. In the same manner, a PHICH including an HARQ-ACK in response to a PUSCH transmitted on UL subframe 2 of the FDD SCell may be received on a special subframe, i.e. subframe 6. The PHICH timing according to the second embodiment of the present disclosure as described above makes it possible to receive a PHICH regarding PUSCH transmissions through all UL subframes of the FDD SCell by establishing additional HARQ-ACK timing to the existing UL-DL configurations of the TDD Cell.

That is, the additional HARQ-ACK timing may be established such that the PHICH for the FDD SCell PUSCH is equally distributed on the TDD DL subframes.

The table illustrated in FIG. 21 represents exemplary timing data of the PUSCH and the PHICH regarding the FDD SCell according to the TDD UL-DL configurations. Thus, the timing data of the PUSCH regarding the FDD SCell and the timing data of the PHICH regarding the FDD SCell may be independent of each other depending on the TDD UL-DL configurations, and may be separately defined. Although seven sets are represented in a single table for the sake of convenience of explanation, they may be separately defined. That is, the timing data of the PUSCH and the PHICH regarding the FDD SCell depending on the TDD UL-DL configurations illustrated in FIG. 21 may be separately defined.

FIG. 22 and FIG. 23 are tables illustrating exemplary PHICH timing relationships when a PCell has TDD UL-DL configuration 0 according to other embodiments of the present disclosure.

Referring to FIG. 22 and FIG. 23, a PHICH may be established to be allocated to a specific TDD DL subframe according to PHICH timing regarding an FDD SCell PUSCH according to the second embodiment of the present disclosure.

FIG. 22 is a table illustrating exemplary PHICH timing relationship when the PCell has TDD UL-DL configuration 0 according to another embodiment of the present disclosure.

Referring to FIG. 22, when the PCell is established as TDD UL-DL configuration 0, it is possible to establish the timing such that the TDD DL subframes on which the PHICH regarding the PUSCH of the FDD SCell is received may be gathered and allocated. For example, when the PCell is established as TDD UL-DL configuration 0, HARQ-ACK timing regarding UL signals transmitted on UL subframes 0, 1, 5, and 6 of the FDD SCell may be additionally established. This is because UL subframes 0, 1, 5, and 6 are established as DL or special subframes in existing TDD UL-DL configuration 0.

Thus, according to another embodiment of the present disclosure, the HARQ-ACK timing regarding UL signals transmitted on UL subframes 0, 1, 5, and 6 of the FDD SCell is additionally established so as to be concentrically allocated to a specific DL subframe of the TDD PCell. That is, the PHICH regarding the PUSCH transmitted on UL subframes 0 and 1 of the FDD SCell may be established to be received on DL subframe 5 of the TDD PCell.

FIG. 23 is a table illustrating exemplary PHICH timing in case the PCell has TDD UL-DL configuration 0 according to further another embodiment of the present disclosure.

Referring to FIG. 23, when the PHICH timing regarding some of the UL subframes of the FDD SCell is additionally established as described with reference to FIG. 22, the PHICH timing may be established such that the PHICH is received on special subframe 6 of the TDD PCell.

For example, the PHICH regarding the PUSCH transmitted on UL subframes 0 and 1 of the FDD SCell may be received on special subframe 6 of the TDD PCell depending on n+k_PHICH.

Although the above case has been described regarding TDD UL-DL configuration 0 by way of example, different TDD UL-DL configurations may be established based on the same principle.

As such, in case the PHICH timing regarding the PUSCH transmitted on the UL subframe of the FDD SCell, in which the additional establishment described with reference to FIG. 11 to FIG. 17 is required, is established to be concentrically allocated to a specific subframe of the TDD PCell, the PDCCH/EPDCCH may include a UL index and a subframe index, by which the relevant PUSCH is intended to be transmitted. PHICH resources transmitted on the same subframe may be divided based on UL index and subframe index data. Alternatively, additional parameters allowing PHICH resources to be divided may be established to be transmitted as being included in the PHICH resources.

In the foregoing description, the figures related to the second embodiment merely illustrate the certain example, and thus the present disclosure is not limited thereto. Any schemes that may be established based on the above-described principle may be included.

FDD PCell and TDD SCell

According to other embodiments of the present disclosure, a case in which the duplex mode of the PCell is FDD and the duplex mode of the SCell is TDD may be considered. When the PCell and the SCell are subjected to self-carrier scheduling, the terminal may receive a PHICH transmitted based on PHICH timing according to the duplex modes of the PCell and the SCell.

When cross-carrier scheduling is applied, according to the embodiments, the PHICH regarding the PUSCH transmitted from the TDD SCell may be established as follows in order to reduce a waste in subframes and efficiently receive the PHICH.

Third Embodiment

Method of Equally Applying TDD PHICH Timing

For example, a SCell operating in TDD duplex mode may be added to a PCell operating in FDD duplex mode. In this case, UL subframe scheduling for the TDD SCell may be performed from DL subframes of the FDD PCell. When cross-carrier scheduling is performed in this manner, all subframes of a single radio frame in the FDD PCell are established as DL subframes, and a UL grant for the TDD SCell is transmitted from the FDD PCell that is performing cross-carrier scheduling. In addition, a PHICH, on which an HARQ-ACK is transmitted in response to a UL transmission from the TDD SCell, is received on the FDD PCell.

Therefore, PHICH timing according to UL PUSCH transmission from the TDD SCell may be established such that TDD ULPHICH timing used in non-cross-carrier scheduling is applicable thereto. That is, the timing for the UL PHICH transmission from the TDD SCell may be established to follow FIG. 10 as described above.

Accordingly, the PHICH timing according to further another embodiment of the present disclosure is established to be the same as the PHICH timing illustrated in FIG. 10 such that the same PHICH timing is applied in non-cross-carrier scheduling and cross-carrier scheduling. According to the establishment as above, when the TDD duplex mode is included, the terminal may operate in the same PHICH timing commonly in TDD-TDD CA and TDD-FDD CA.

In the same manner, control channel reception timing and timing for PUSCH transmission to the SCell may be applied according to TDD UL-DL configurations of the SCell as in non-cross-carrier scheduling. That is, the control channel reception timing and the PUSCH transmission timing may be applied according to the timing table in FIG. 9.

Fourth Embodiment

Method of Applying PHICH Timing of FDD PCell

Different from the third embodiment, when cross-carrier scheduling is performed, PHICH timing of the FDD PCell may be applied as PHICH timing regarding UL transmission to the TDD SCell.

Specifically, the FDD SCell has DL subframes configured within all radio frames. Thus, PHICH timing in which HARQ-ACKs are transmitted in response to UL signals transmitted from UL subframes of the TDD SCell may be established the same as the PHICH timing of the FDD PCell without any problems.

For example, in case of cross-carrier scheduling, a UL grant regarding the TDD SCell is received on the $(n-k)^{th}$ subframe in the FDD PCell. Thus, a terminal upon receiving the grant may transmit a UL to the TDD SCell on the $n^{th}$ subframe, and after the transmission of the relevant UL, may receive a PHICH in PHICH timing established in the FDD PCell. That is, the PHICH may be received on a DL subframe of the FDD PCell corresponding to the $(n+k\_PHICH)^{th}$ subframe (k_PHICH=4 for FDD).

This may be considered as a scheme of establishing PUSCH and PHICH timing regarding the UL transmission to the TDD SCell according to the FDD PCell such that the PHICH timing may be equally established in the case of FDD-FDD CA and FDD-TDD CA regardless of different duplex modes.

The first to fourth embodiments of the present disclosure as described above are scenarios used in TDD-FDD joint operation and CA, applicable to both the case in which CA is usable in the UL through two or more component carriers and the case in which the CA is unusable in the UL, i.e. a single component carrier is used.

Hereinafter, operations of a terminal and a base station will be described with reference to the drawings.

Figure 24:
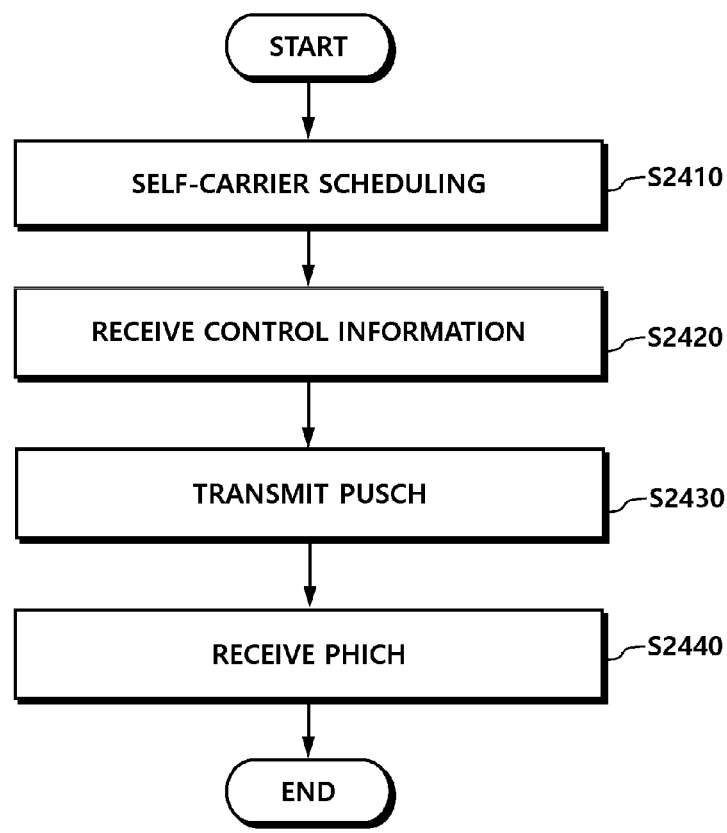
FIG. 24 is a diagram illustrating an exemplary operation of a terminal according to an embodiment of the present disclosure.

FIG. 24 is a diagram illustrating an exemplary operation of a terminal according to an embodiment of the present disclosure.

In accordance with an embodiment of the present disclosure, a method may be provided for processing a PHICH in a terminal configured with a PCell and an SCell operating in different duplex modes. The method includes: establishing the PCell and the SCell to be self-carrier scheduled; receiving control information for PUSCH transmission from each of the PCell and the SCell; transmitting, in the PCell or the SCell, a PUSCH based on the received control information for the PUSCH transmission; and receiving a PHICH regarding the PUSCH from each of the PCell and the SCell, transmitted based on PHICH timing of each of the PCell and the SCell in response to the transmission of the established PUSCH.

Referring to FIG. 24, at S2410, the terminal is configured with the PCell and the SCell operating in different duplex modes, and the terminal may be established such that each of the PCell and the SCell is self-carried scheduled. At S2420, the terminal may receive control information for PUSCH transmission from each of the PCell and the SCell. Specifically, the terminal may receive control information from the PCell in order to execute a PUSCH transmission on a subframe of the PCell. In the same manner, the terminal may receive control information from the SCell in order to execute a PUSCH transmission on a subframe of the SCell.

At S2430, the terminal may transmit a PUSCH in each of the PCell and the SCell based on the control information for the PUSCH transmission. For example, the terminal may transmit the PUSCH in the PCell based on the control information received from the PCell. In addition, the terminal may transmit the PUSCH in the SCell based on the control information received from the SCell.

Afterwards, at S2440, the terminal may receive a PHICH including HARQ-ACK information regarding the PUSCH, transmitted from each of the PCell and the SCell in PHICH timing in response to the established PUSCH transmission. For example, when the terminal established to be self-carrier scheduled receives the PHICH, the PHICH regarding the PUSCH transmitted from the PCell may be a PHICH transmitted based on the PHICH timing of the PCell. In addition, the PHICH regarding the PUSCH transmitted from the SCell may be a PHICH transmitted based on the PHICH timing of the SCell.

That is, when the PHICH regarding the PUSCH is transmitted from each of the PCell and the SCell of the terminal operating in different duplex modes, the PHICH may be transmitted based on the PHICH timing established according to the duplex mode of each cell. The terminal may receive the PHICH transmitted based on the PHICH timing established according to the duplex mode of the relevant cell.

Figure 25:
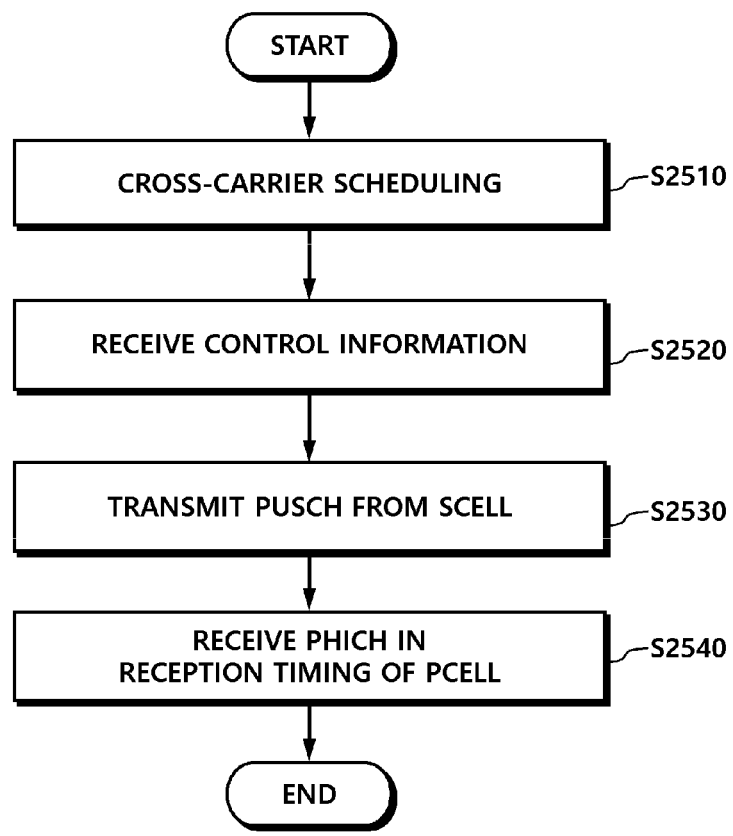
FIG. 25 is a diagram illustrating another exemplary operation of a terminal according to another embodiment of the present disclosure.

FIG. 25 is a diagram illustrating another exemplary operation of a terminal according to further another embodiment of the present disclosure.

In accordance with further another embodiment of the present disclosure, a method may be provided for processing a PHICH in a terminal configured with a PCell operating in a TDD mode and a SCell operating in an FDD mode. The method includes: performing setting to be cross-carrier scheduled about the SCell; receiving control information for PUSCH transmission in the SCell from the PCell; transmitting, in the SCell, a PUSCH based on the control information; and receiving, in the PCell, a PHICH regarding the PUSCH transmitted based on PHICH timing of the SCell.

Referring to FIG. 25, at S2510, the terminal configured with the PCell operating in a TDD mode and the SCell operating in an FDD mode is cross-carried scheduled about the SCell. At S2520, the terminal receives control information regarding PUSCH transmission to be transmitted to the SCell from a scheduling cell. For example, it is possible to control the PUSCH transmission of the SCell based on control information transmitted to the PCell. In addition, it is possible to perform PUSCH transmission timing and PUSCH resource allocation of the PCell or the SCell based on UL grant information included in the PDCCH/EPDCCH transmitted to the PCell.

At S2530, the terminal may transmit, in the SCell, a PUSCH based on the control information (e.g. an SCell UL grant) received from the scheduling cell. For example, it is possible to transmit, in the SCell, the PUSCH based on the control information received from the PCell. Since the SCell has the FDD mode, the PUSCH may be transmitted on a UL subframe.

Afterwards, at S2540, the terminal may receive a PHICH regarding the PUSCH transmitted in the SCell, based on the PHICH timing of the scheduling cell, from the scheduling cell. For example, the terminal may receive, in the PCell, the PHICH regarding the PUSCH transmitted in the SCell. The PHICH regarding the PUSCH transmitted in the SCell may be received in the PHICH timing determined according to the TDD UL-DL configurations of the PCell. That is, the terminal may receive the PHICH that the base station has transmitted based on the PHICH timing of the PCell.

Specifically, when the PCell is established to be in TDD and the SCell is established to be in FDD as in the first embodiment, the PHICH regarding the PUSCH transmitted in the SCell may be received on a DL subframe of the PCell in which the HARQ-ACK timing of the TDD PCell is applied. That is, the PHICH timing regarding the PUSCH transmitted on a UL subframe of the FDD SCell may be applied differently based on the PHICH timing applied to UL-DL configurations of the TDD PCell. In this case, however, PHICH timing regarding a UL subframe of a specific FDD SCell may not be established, which is problematic.

Alternatively, as in the second embodiment, PHICH timing regarding a UL subframe of a specific FDD SCell, in which the above-described problem occurs, may be additionally defined. Specifically, when the PCell is established to be in the TDD mode and the SCell is established to be in the FDD mode, the PHICH may be received on a DL subframe of the PCell, in which additional HARQ-ACK timing is applied to the HARQ-ACK timing of the TDD PCell.

The additional HARQ-ACK timing may be established such that the HARQ-ACK timing regarding the UL signal transmitted on the UL subframe of the SCell mapped to the DL subframe of the TDD PCell is equally distributed to the DL subframes of the TDD PCell or is concentrated to some of the DL subframes of the PCell. For example, the additional HARQ-ACK timing may be established to be equally distributed as in FIG. 18 or the additional HARQ-ACK timing may be established to be concentrated in specific subframes as in FIG. 19 and FIG. 20.

Figure 26:
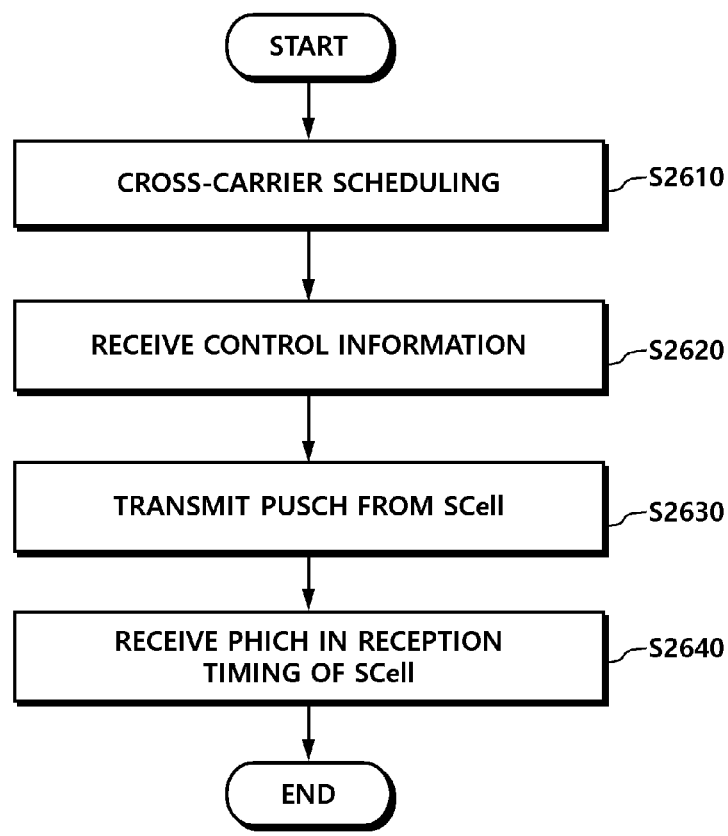
FIG. 26 is a diagram illustrating further another exemplary operation of a terminal according to further another embodiment of the present disclosure.

Referring to FIG. 26, in accordance with at least one embodiment of the present disclosure, a method may be provided for processing a PHICH in a terminal configured with a PCell operating in an FDD mode and an SCell operating in a TDD mode. The method includes: performing setting to be cross-carrier scheduled about the SCell; receiving control information for PUSCH transmission in the SCell from the PCell; transmitting, in the SCell, a PUSCH based on the control information; and receiving, in the PCell, a PHICH regarding the PUSCH transmitted based on PHICH timing of the SCell.

Specifically, at S2610, the terminal is configured with the PCell operating in an FDD mode and the SCell operating in a TDD mode, and the terminal performs setting to be cross-carried scheduled about the SCell. At S2620, the terminal may receive control information from a scheduling cell, the control information relating to PUSCH transmission to the SCell. For example, it is possible to control the PUSCH transmission of the SCell based on control information transmitted to the PCell. In addition, it is possible to perform PUSCH transmission timing and PUSCH resource allocation of the PCell or the SCell based on UL grant information included in the PDCCH/EPDCCH transmitted to the PCell.

At S2630, the terminal may transmit, in the SCell, a PUSCH based on the control information (e.g. an SCell UL grant) received from the scheduling cell. For example, it is possible to transmit, in the SCell, the PUSCH based on the control information received from the PCell. Since the SCell is in the TDD mode, the PUSCH may be transmitted according to relevant TDD UL-DL configurations.

Afterwards, at S2640, the terminal may receive a PHICH regarding the PUSCH transmitted in the SCell, based on the PHICH timing of a cell established to be scheduled, from the scheduling cell. For example, the terminal may receive the PHICH regarding the PUSCH transmitted in the SCell in PHICH timing according to TDD UL-DL configurations of the SCell. That is, the terminal may receive the PHICH that the base station has transmitted based on the TDD PHICH timing of the SCell.

For example, as in the third embodiment, when the PCell is established to be in FDD and the SCell is established to be in TDD, the PHICH may be received on a DL subframe of the PCell in which the HARQ-ACK timing of the TDD SCell is applied.

In another example, as in the fourth embodiment, when the PCell is established to be in FDD and the SCell is established to be in TDD, the PHICH regarding a UL signal transmitted on subframe n may be received on DL subframe n+4 of the PCell. That is, the PHICH timing of the FDD PCell may be applied equally.

Figure 27:
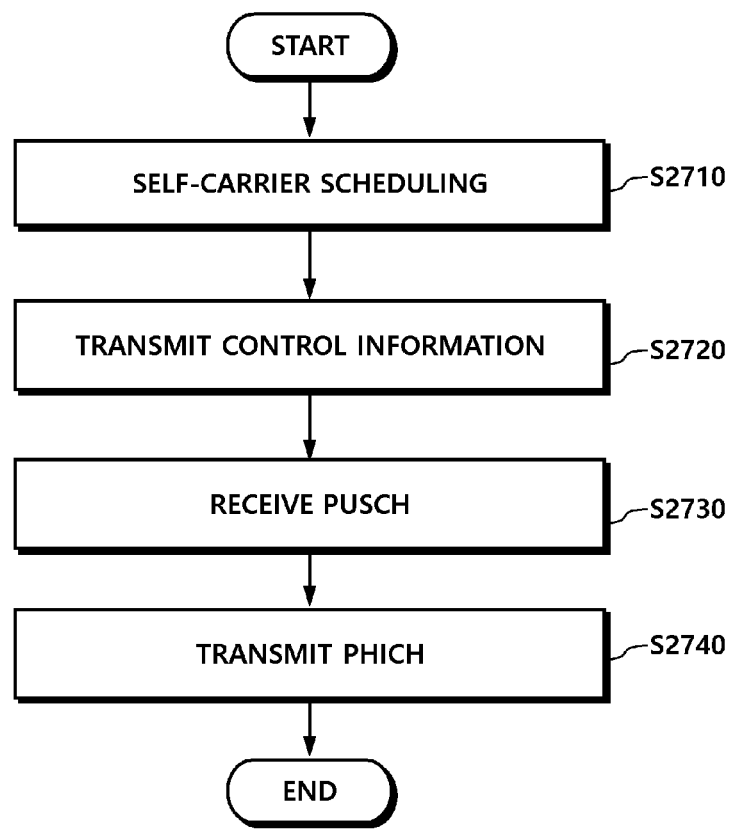
FIG. 27 is a diagram illustrating an exemplary operation of a base station according to an embodiment of the present disclosure.

FIG. 27 is a diagram illustrating an exemplary operation of a base station according to another embodiment of the present disclosure.

In accordance with still another embodiment of the present disclosure, a method may be provided for transmitting, in a base station, a PHICH to a terminal configured with a PCell and an SCell operating in different duplex modes. The method includes: controlling each of the PCell and the SCell to be self-carrier scheduled; transmitting control information for PUSCH transmission in each of the PCell and the SCell of the terminal; receiving a PUSCH transmitted in each of the PCell and the SCell; and transmitting a PHICH regarding the PUSCH to each of the PCell and the SCell, based on PHICH timing of the PCell or the SCell in response to the PUSCH transmission.

Referring to FIG. 27, at S2710, the base station performing communications with the terminal configured with the PCell and the SCell operating in different duplex modes can control each of the PCell and the SCell to be self-carrier scheduled. At S2720, the base station can transmit control information for PUSCH transmission in each of the PCell and the SCell. For example, the base station can control self-carrier scheduling by transmitting, in each of the PCell and the SCell, the control information of each of the PCell and the SCell.

At S2730, the base station may receive a PUSCH from the terminal, transmitted in each of the PCell and the SCell based on the control information for the PUSCH transmission in each of the PCell and the SCell.

At S2740, the base station may transmit a PHICH including HARQ-ACK information according to the PUSCH transmission established in each of the PCell and the SCell, regarding the PUSCH received in the PCell or the SCell. For example, the transmission timing of the PHICH follows timing established according to the duplex mode of each of the PCell and the SCell in which the PUSCH is received. In an example, when the duplex mode of the PCell is FDD and the duplex mode of the SCell is TDD, in the case of the PUSCH received in the PCell, the PHICH is transmitted in FDD PHICH timing. In the same manner, in the case of PUSCH received in the SCell, the PHICH may be transmitted in TDD PHICH timing. When the duplex mode of the PCell is TDD and the duplex mode of the SCell is FDD, the PHICH may be transmitted in PHICH timing according to the duplex mode of the relevant cell in which the PUSCH is received.

Cross-carrier scheduling will be described with reference to FIG. 28 and FIG. 29.

Figure 28:
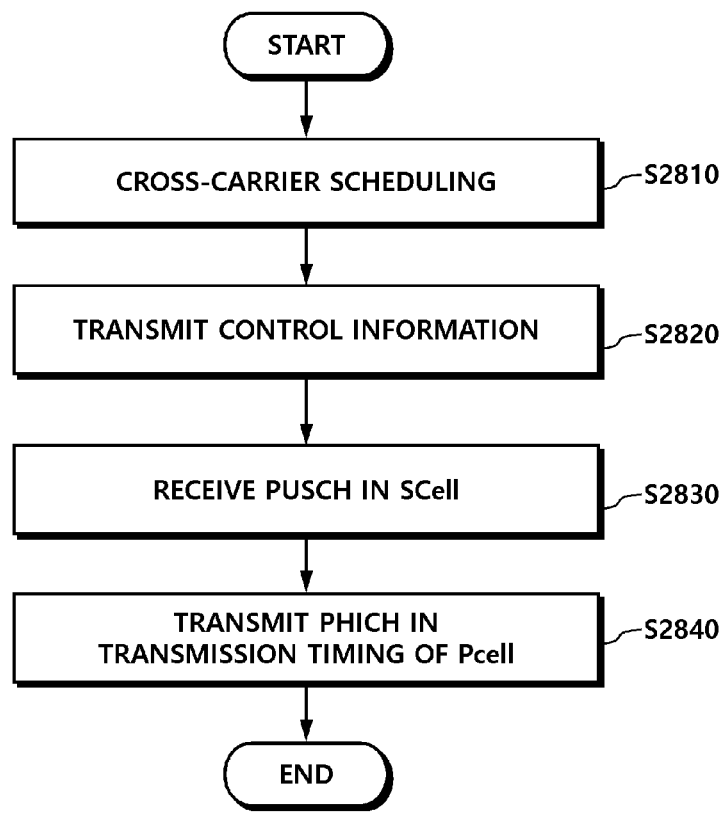
FIG. 28 is a diagram illustrating another exemplary operation of a base station according to another embodiment of the present disclosure.

FIG. 28 is a diagram illustrating another exemplary operation of a base station according to another embodiment of the present disclosure.

In accordance with another embodiment of the present disclosure, a method may be provided for transmitting, in a base station, a PHICH to a terminal configured with a PCell operating in a TDD mode and an SCell operating in an FDD mode. The method may include: controlling to be cross-carrier scheduled about the SCell; transmitting control information for PUSCH transmission to the PCell; receiving a PUSCH transmitted in the SCell based on the control information; and transmitting a PHICH regarding the PUSCH to the PCell, based on PHICH timing of the SCell.

Referring to FIG. 28, at S2810, the base station performing communications with the terminal configured with the PCell and the SCell operating in different modes, may control the SCell to be cross-carrier controlled from a scheduling cell. At S2820, the base station may transmit control information from the scheduling cell, the control information relating to PUSCH transmission to the SCell. For example, a PDCCH/EPDCCH including UL grant information or the like of the SCell is transmitted as the control information to the PCell, such that the terminal may be controlled to be cross-carrier scheduled. The control information may be transmitted on a DL subframe of the PCell.

At S2830, the base station may receive a PUSCH from the terminal, transmitted in the SCell based on the control information transmitted in the scheduling cell. For example, it is possible to receive the PUSCH transmitted in the SCell based on the control information transmitted from the PCell. The SCell has the FDD mode, the PUSCH may be received on a UL subframe.

At S2840, the base station may transmit a PHICH regarding the PUSCH from the scheduling cell, based on the PHICH timing of the scheduling cell. For example, the PHICH including HARQ-ACK information regarding the PUSCH received in the SCell may be transmitted to the terminal from the PCell based on the PHICH timing of the PCell.

The scheme in which the base station transmits the PHICH may be applied differently depending on the duplex mode of the SCell as described above. Specifically, PHICH timing applicable to each of the above-described embodiments will be described.

Specifically, when the PCell is established to be in TDD and the SCell is established to be in FDD as in the first embodiment, a PHICH regarding a PUSCH transmitted to the SCell may be transmitted to the PCell through the application of the PHICH timing of the TDD PCell. That is, the PHICH regarding the PUSCH received on a UL subframe of the FDD SCell may be transmitted by being differently applied in the PHICH timing applied to UL-DL configurations of the TDD PCell. In this case, however, the PHICH timing regarding a UL subframe of a specific FDD SCell may not be established, which is problematic.

Alternatively, as in the second embodiment, PHICH timing regarding a UL subframe of a specific FDD SCell in which the above-described problem occurs may be additionally defined. Specifically, when the PCell is established to be in TDD and the SCell is established to be in FDD, the PHICH may be transferred on a DL subframe of the PCell in which additional PHICH timing is applied to the PHICH timing of the TDD PCell.

The additional HARQ-ACK timing may be established such that the HARQ-ACK timing regarding the UL signal transmitted on the UL subframe of the SCell mapped to the DL subframe of the TDD PCell is equally distributed to the DL subframes of the TDD PCell or is concentrated to some of the DL subframes of the PCell. For example, the additional HARQ-ACK timing may be established to be equally distributed as in FIG. 18 or may be established to be concentrated in specific subframes as in FIG. 19 and FIG. 20.

Figure 29:
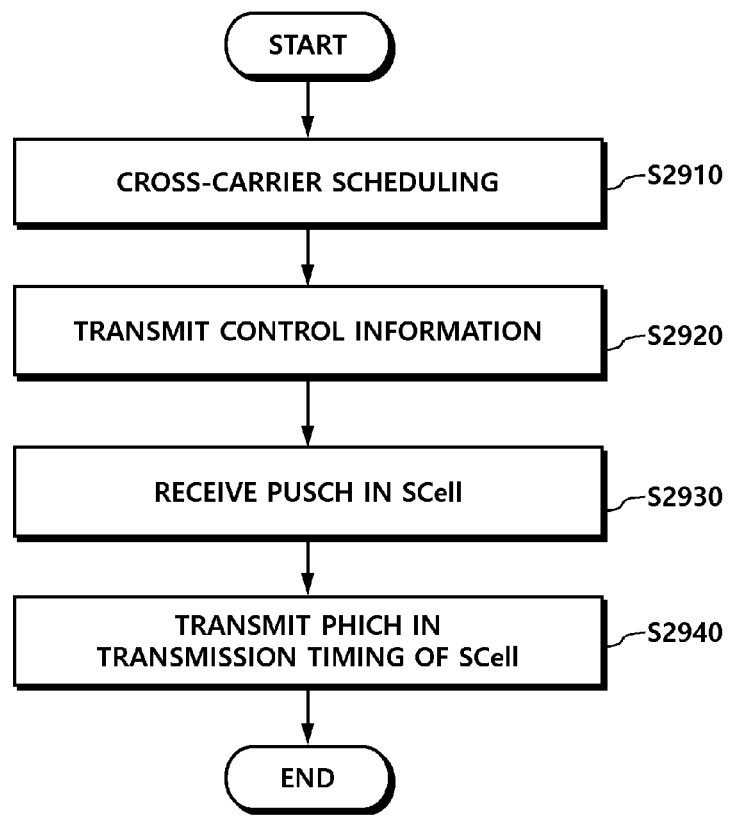
FIG. 29 is a diagram illustrating further another exemplary operation of a base station according to further another embodiment of the present disclosure.

FIG. 29 is a diagram illustrating further another exemplary operation of a base station according to another embodiment of the present disclosure.

In accordance with further another embodiment of the present disclosure, a method may be provided for transmitting, by a base station, a PHICH to a terminal configured with a PCell operating in an FDD mode and an SCell operating in a TDD mode. The method includes: controlling to be cross-carrier scheduled about the SCell; transmitting control information for PUSCH transmission to the PCell; receiving a PUSCH transmitted in the SCell based on the control information; and transmitting a PHICH regarding the PUSCH to the PCell, based on PHICH timing of the SCell.

Referring to FIG. 29, at S2910, the base station performing communications with the terminal is configured with the PCell and the SCell operating in different duplex modes, and the terminal may control the SCell to be cross-carrier controlled from a scheduling cell. At S2920, the base station may transmit control information from the scheduling cell, the control information relating to PUSCH transmission to the SCell. For example, a PDCCH/EPDCCH including UL grant information or the like of the SCell is transmitted as the control information to the PCell, such that the terminal may be controlled to be cross-carrier scheduled. The control information may be transmitted on a DL subframe of the PCell.

At S2930, the base station may receive a PUSCH from the terminal, transmitted in the SCell based on the control information transmitted in the scheduling cell. For example, it is possible to transmit, in the SCell, the PUSCH based on the control information transmitted from the PCell. Since the SCell is in the TDD mode, the PUSCH may be received on a UL subframe according to relevant TDD UL-DL configurations.

At S2940, the base station may transmit a PHICH regarding the PUSCH based on the PHICH timing established to be scheduled from the scheduling cell. For example, the PHICH including HARQ-ACK information regarding the PUSCH received in the SCell may be transmitted from the PCell to the terminal based on the PHICH timing of the SCell.

For example, as in the third embodiment, when the PCell is established to be in FDD and the SCell is established to be in TDD, the PHICH may be transmitted on a DL subframe of the PCell in which the PHICH timing of the TDD SCell is applied.

In another example, as in the fourth embodiment, when the PCell is established to be in FDD and the SCell is established to be in TDD, the PHICH regarding a UL signal transmitted on subframe n may be received on DL subframe n+4 of the PCell. That is, the PHICH timing of the FDD PCell may be applied equally.

According to the present disclosure as set forth above, it is possible to remove the ambiguity between the terminal and the base station regarding the actions of the terminal operating depending on the PCell/SCell configurations established between the terminal and the base station and the configurations of the base station when CA is performed using carriers having different duplex modes, such as TDD and FDD. In addition, it is possible to accurately establish the transmission and reception operations of the UL/DL control channel performed between the terminal and the base station, including access procedures, UL/DL data transmission, and HARQ procedures. Furthermore, it is possible to obtain reliability on the data transmission between the terminal and the base station, thereby increasing UL/DL data transmission rates.

Hereinafter, configurations of a terminal and a base station will be described with reference to the accompanying drawings.

Figure 30:
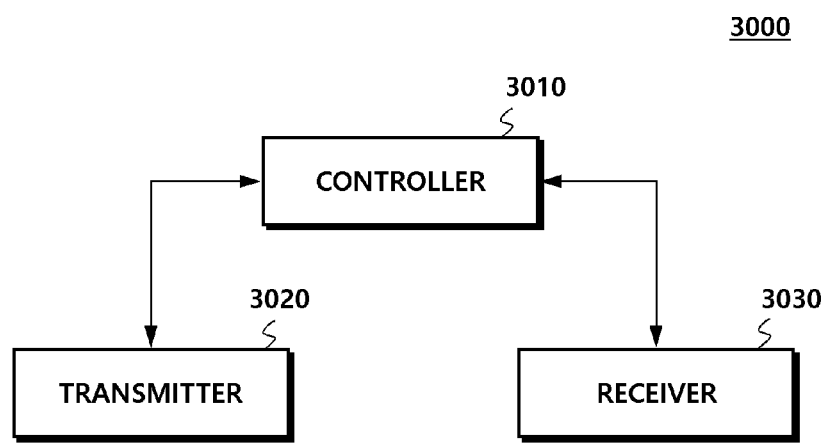
FIG. 30 is a diagram illustrating a configuration of a terminal according to an embodiment of the present disclosure.

FIG. 30 is a diagram illustrating a configuration of a terminal according to an embodiment of the present disclosure.

Referring to FIG. 30, the terminal 300 according to an embodiment of the present disclosure includes a controller 3010, a transmitter 3020, and a receiver 3030.

In accordance with an embodiment of the present disclosure, a terminal is configured with a PCell and an SCell operating in different duplex modes and processes a PHICH. In the terminal, the controller 3010 is established such that each of the PCell and the SCell is self-carrier scheduled. The receiver 3030 receives control information for PUSCH transmissions from the PCell or the SCell. The transmitter 3020 transmits a PUSCH on each of the PCell and the SCell based on control information. The receiver 3030 may further receive a PHICH regarding the PUSCH, transmitted from each of the PCell and the SCell based on the PHICH timing of the PCell and the SCell.

In addition, a terminal may be provided for processing a PHICH when a PCell operating in a TDD mode and an SCell operating in an FDD mode are configured. In the terminal, the controller 3010 may perform setting to be cross-carrier scheduled about the SCell. The receiver 3030 receives control information from the PCell, the control information relating to PUSCH transmission in the SCell. The transmitter 3020 transmits a PUSCH in the SCell based on the control information. The receiver 3030 may further receive a PHICH regarding the PUSCH transmitted in the PCell based on the PHICH timing of the PCell.

Furthermore, a terminal may be provided for processing a PHICH when a PCell operating in an FDD mode and an SCell operating in a TDD mode are configured. In the terminal, the controller 3010 performs setting to be cross-carrier scheduled about the SCell. The receiver 3030 receives control information from the PCell, the control information relating to PUSCH transmission in the SCell. The transmitter 3020 transmits a PUSCH in the SCell based on the control information. The receiver 3030 may further receive a PHICH regarding the PUSCH transmitted in the PCell based on the PHICH timing of the SCell.

In addition, the receiver 3030 may receive the PHICH transmitted in points of timing established according to various embodiments. In addition, the transmitter 3020 and the receiver 3030 are used to transmit and receive signals, messages, and data necessary to realize the present disclosure as described above.

Figure 31:
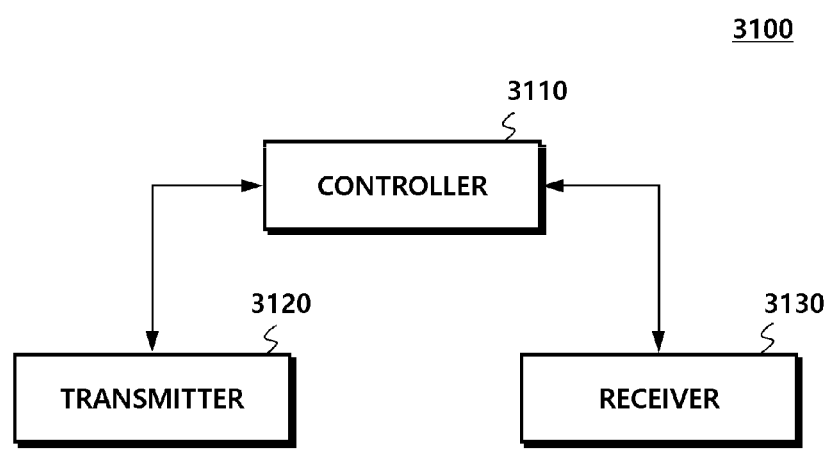
FIG. 31 a diagram illustrating a configuration of a base station according to an embodiment of the present disclosure.

FIG. 31 a diagram illustrating a configuration of a base station according to an embodiment of the present disclosure.

Referring to FIG. 31, the base station according to an embodiment of the present disclosure includes a controller 3110, a transmitter 3120, and a receiver 3130.

The base station according to an embodiment of the present disclosure transmits a PHICH to a terminal configured with a PCell and an SCell operating in different duplex modes. In the base station, the controller 3110 controls each of the PCell and the SCell to be self-carrier scheduled. The transmitter 3120 transmits control information for PUSCH transmission in each of the PCell and the SCell. The receiver 3130 receives a PUSCH transmitted in each of the PCell and the SCell based on the control information. The transmitter 3120 may further transmit a PHICH regarding the PUSCH to each of the PCell and the SCell, based on the PHICH timing of the PCell or the SCell.

In accordance with another embodiment, a base station may be provided for transmitting a PHICH to a terminal configured with a PCell operating in a TDD mode and an SCell operating in an FDD mode. In the base station, the controller 3110 controls each of the PCell and the SCell to be cross-carrier scheduled. The transmitter 3120 transmits control information to the PCell, the control information relating to PUSCH transmission in the SCell. The receiver 3130 receives a PUSCH in the SCell based on the control information. The transmitter may further transmit a PHICH regarding the PUSCH to the PCell based on the PHICH timing of the PCell.

In accordance with further another embodiment, a base station may be provided for transmitting a PHICH to a terminal configured with a PCell operating in an FDD mode and an SCell operating in a TDD mode. In the base station, the controller 3110 controls each of the PCell and the SCell to be cross-carrier scheduled. The transmitter 3120 transmits control information to the PCell, the control information relating to PUSCH transmission in the SCell. The receiver 3130 receives a PUSCH in the SCell based on the control information. The transmitter 3120 may further transmit a PHICH regarding the PUSCH to the PCell based on the PHICH timing of the SCell.

Specifically, when the PCell is established to be in the TDD mode and the SCell is established to be in the FDD mode, the transmitter 3120 may transmit the PHICH on a DL subframe of the PCell in which the HARQ-ACK timing of the TDD PCell is applied. That is, the PHICH timing regarding the PUSCH received on a UL subframe of the FDD SCell may be applied differently according to the UL-DL configurations of the TDD PCell. In this case, however, the PHICH timing regarding a UL subframe of a specific FDD SCell may not be established, which is problematic.

Alternatively, as in the second embodiment, the controller 3110 may additionally define PHICH timing regarding a UL subframe of a specific FDD SCell, in which the above-described problem occurs. When the PCell is established to be in the TDD mode and the SCell is established to be in the FDD mode, the transmitter 3120 may transmit a PHICH on a DL subframe of the PCell, in which additional HARQ-ACK timing is applied to the HARQ-ACK timing of the TDD PCell.

The controller 3110 may establish the additional HARQ-ACK timing such that the HARQ-ACK regarding the UL signal received on the UL subframes of the SCell mapped to the DL subframes of the TDD PCell is equally distributed or is concentrated to some of the DL subframes of the PCell. For example, the additional HARQ-ACK timing may be established to be equally distributed as in FIG. 18 or may be established to be concentrated in specific subframes as in FIG. 19 and FIG. 20.

When the PCell is established to be in the FDD mode and the SCell is established to be in the TDD mode, the transmitter 3120 may transmit a PHICH on a DL subframe of the PCell, in which the HARQ-ACK timing of the TDD SCell is applied.

Alternatively, when the PCell is established to be in the FDD mode and the SCell is established to be in the TDD mode as in the fourth embodiment, the transmitter may transmit a PHICH regarding a UL signal, received on the subframe n, on the DL subframe n+4 of the PCell. That is, the PHICH timing of the FDD PCell may be applied equally.

In addition, the receiver 3130 receives UL control information, data, and a message from the terminal through the relevant channel.

Furthermore, the transmitter 3120 transmits DL control information, data, and messages to the terminal through the relevant channel.

The foregoing descriptions and the accompanying drawings have been presented in order to explain the certain principles of the present invention. A person skilled in the art to which the invention relates can make many modifications and variations by combining, dividing, substituting for, or changing the elements without departing from the principle of the invention. The foregoing embodiments disclosed herein shall be interpreted as illustrative only but not as limitative of the principle and scope of the invention. It should be understood that the scope of the invention shall be defined by the appended Claims and all of their equivalents fall within the scope of the invention.

The invention claimed is:

1. A method of receiving a physical hybrid ARQ indicator channel (PHICH) in a terminal configured with a primary cell and a secondary cell, the method comprising:
    establishing at least one of the primary cell and the secondary cell to be carrier scheduled, wherein the primary cell and the secondary cell are different cells configured to operate in different duplex modes;
    receiving control information for PUSCH transmission from at least one of the primary cell and the secondary cell;
    transmitting, in at least one of the primary cell and the secondary cell, a PUSCH based on the control information; and
    receiving a PHICH regarding the PUSCH from at least one of the primary cell and the secondary cell, transmitted based on PHICH timing of at least one of the primary cell and the secondary cell in response to the transmission of the PUSCH.

2. The method according to claim 1, wherein:
    the establishing at least one of the primary cell and the secondary cell comprises establishing each of the primary cell and the secondary cell to be self-carrier scheduled;
    the receiving control information comprises receiving control information for PUSCH transmission from each of the primary cell and the secondary cell;
    the transmitting comprises transmitting, in each of the primary cell and the secondary cell, a PUSCH based on the control information; and
    the receiving a PHICH comprises receiving a PHICH regarding the PUSCH from the primary cell or the secondary cell, transmitted based on PHICH timing of the primary cell and the secondary cell in response to the transmission of the PUSCH.

3. The method according to claim 1, wherein the duplex mode of the primary cell is established as time division duplex (TDD), and the duplex mode of the secondary cell is established as frequency division duplex (FDD).

4. The method according to claim 1, wherein the duplex mode of the primary cell is established as frequency division duplex (FDD), and the duplex mode of the secondary cell is established as time division duplex (TDD).

5. The method according to claim 4, wherein:
    the establishing at least one of the primary cell and the secondary cell comprises being established to be cross-carrier scheduled about the secondary cell;
    the receiving control information comprises receiving control information for PUSCH transmission in the secondary cell from the primary cell;
    the transmitting comprises transmitting, in the secondary cell, a PUSCH based on the control information; and
    the receiving a PHICH comprises receiving, in the primary cell, a PHICH regarding the PUSCH transmitted based on PHICH timing of the secondary cell.

6. A method of transmitting, in a base station, a physical hybrid ARQ indicator channel (PHICH) to a terminal configured with a primary cell and a secondary cell, the method comprising:
    controlling at least one of the primary cell and the secondary cell to be carrier scheduled, wherein the primary cell and the secondary cell are different cells configured to operate in different duplex modes;
    transmitting control information for PUSCH transmission in at least one of the primary cell and the secondary cell of the terminal;
    receiving a PUSCH transmitted in at least one of the primary cell and the secondary cell based on the control information; and
    transmitting a PHICH regarding the PUSCH to at least one of the primary cell and the secondary cell, based on PHICH timing of at last one of the primary cell and the secondary cell in response to the PUSCH transmission.

7. The method according to claim 6, wherein:
    the controlling at least one of the primary cell and the secondary cell comprises controlling each of the primary cell and the secondary cell to be self-carrier scheduled;
    the transmitting control information comprises transmitting control information for PUSCH transmission in each of the primary cell and the secondary cell of the terminal;
    the receiving a PUSCH comprises receiving a PUSCH transmitted in each of the primary cell and the secondary cell based on the control information; and
    the transmitting a PHICH comprises transmitting a PHICH regarding the PUSCH to each of the primary cell and the secondary cell, based on PHICH timing of each of the primary cell and the secondary cell in response to the PUSCH transmission.

8. The method according to claim 6, wherein the duplex mode of the primary cell is established as time division duplex (TDD), and the duplex mode of the secondary cell is established as frequency division duplex (FDD).

9. The method according to claim 6, wherein the duplex mode of the primary cell is established as frequency division duplex (FDD), and the duplex mode of the secondary cell is established as time division duplex (TDD).

10. The method according to claim 9, wherein:
    the controlling at least one of the primary cell and the secondary cell comprises controlling to be cross-carrier scheduled about the secondary cell;
    the transmitting control information comprises transmitting control information for PUSCH transmission to the primary cell;
    the receiving a PUSCH comprises receiving a PUSCH transmitted in the secondary cell based on the control information; and the transmitting a PHICH comprises transmitting a PHICH regarding the PUSCH to the primary cell, based on PHICH timing of the secondary cell.

11. A terminal, in which a primary cell and a secondary cell are configured, the terminal receiving a physical hybrid ARQ indicator channel (PHICH), and comprising:
   a controller configured to be carrier scheduled for at least one of the primary cell and the secondary cell;
   a receiver configured to receive control information from at least one of the primary cell and the secondary cell; and
   a transmitter configured to transmit a PUSCH from at least one of the primary cell and the secondary cell based on the control information,
   wherein the primary cell and the secondary cell are different cells configured to operate in different duplex modes; and
   wherein the receiver is configured to receive a PHICH regarding the PUSCH transmitted from at least one of the primary cell and the secondary cell based on PHICH timing of at least one of the primary cell and the secondary cell in response to the PUSCH transmission.

12. The terminal according to claim 11, wherein:
   the controller is configured to set each of the primary cell and the secondary cell to be self-carrier scheduled;
   the transmitter is configured to transmit a PUSCH from the primary cell or the secondary cell based on the control information; and
   the receiver is configured to receive control information from the primary cell or the secondary cell and is configured to receive a PHICH regarding the PUSCH transmitted from each of the primary cell and the secondary cell based on PHICH timing of each of the primary cell and the secondary cell in response to the PUSCH transmission.

13. The terminal according to claim 11, wherein the duplex mode of the primary cell is established as time division duplex (TDD), and the duplex mode of the secondary cell is established as frequency division duplex (FDD).

14. The method according to claim 11, wherein the duplex mode of the primary cell is established as frequency division duplex (FDD), and the duplex mode of the secondary cell is established as time division duplex (TDD).

15. The terminal according to claim 14, wherein:
   the controller is configured to be cross-carrier scheduled about the secondary cell;
   the transmitter is configured to transmit a PUSCH from the secondary cell based on the control information; and
   the receiver is configured to receive, in the primary cell, control information for PUSCH transmission from the secondary cell and is configured to receive the PHICH regarding the PUSCH transmitted from the primary cell based on PHICH timing of the secondary cell.

* * * * *

UNITED STATES PATENT AND TRADEMARK OFFICE
CERTIFICATE OF CORRECTION

PATENT NO. : 9,871,612 B2  
APPLICATION NO. : 15/025001  
DATED : January 16, 2018  
INVENTOR(S) : Noh et al.

Page 1 of 1

It is certified that error appears in the above-identified patent and that said Letters Patent is hereby corrected as shown below:

In the Claims

In Claim 1, at Column 29, Line 39, after the word "PHICH" add ",".
In Claim 5, at Column 30, Line 3, after the word "comprises" delete "being established to be cross-carrier scheduled about the secondary cell" and insert therefor -- establishing the secondary cell to be cross-carrier scheduled --.
In Claim 5, at Column 30, Line 11, after the word "PHICH" add ",".

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*